United States Patent [19]
Rhyne

[11] Patent Number: 5,458,176
[45] Date of Patent: Oct. 17, 1995

[54] TIRE HAVING UNIFORMITY CORRECTION WITHOUT GRINDING

[75] Inventor: Timothy B. Rhyne, Greenville, S.C.

[73] Assignee: Michelin Recherche et Technique S.A., Granges-Pacot, Switzerland

[21] Appl. No.: 303,228

[22] Filed: Sep. 8, 1994

Related U.S. Application Data

[62] Division of Ser. No. 863,256, Apr. 3, 1992, Pat. No. 5,365,781.

[51] Int. Cl.[6] .................................................. B60C 9/02
[52] U.S. Cl. ........................ 152/556; 152/154.1; 152/454; 152/548
[58] Field of Search .................................. 152/454, 548, 152/556, 154.1; 425/58.1; 264/40.1; 73/146

[56] References Cited

U.S. PATENT DOCUMENTS

| | | | |
|---|---|---|---|
| 3,529,048 | 9/1970 | Kovac et al. | 264/502 |
| 3,632,701 | 1/1972 | Devitt et al. | 264/40.1 |

*Primary Examiner*—Geoffrey L. Knable
*Attorney, Agent, or Firm*—Brumbaugh, Graves, Donohue & Raymond

[57] ABSTRACT

A method and apparatus for reducing the magnitude of a uniformity characteristic in a cured tire and the tire produced thereby. A signal is generated which is indicative of the magnitude of the uniformity characteristic. The signal is also indicative of the location on the tire to be corrected. At least a portion of one carcass reinforcing member of the tire is permanently deformed a predetermined amount at the location indicated by the signal to correct the uniformity characteristic.

4 Claims, 13 Drawing Sheets

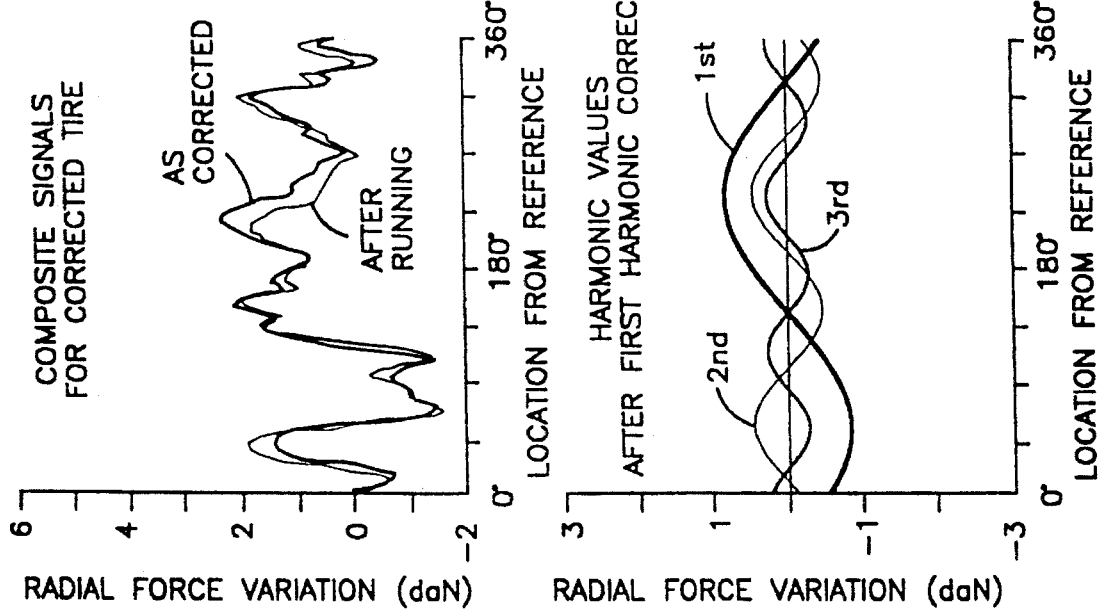
Fig.4
Fig.5
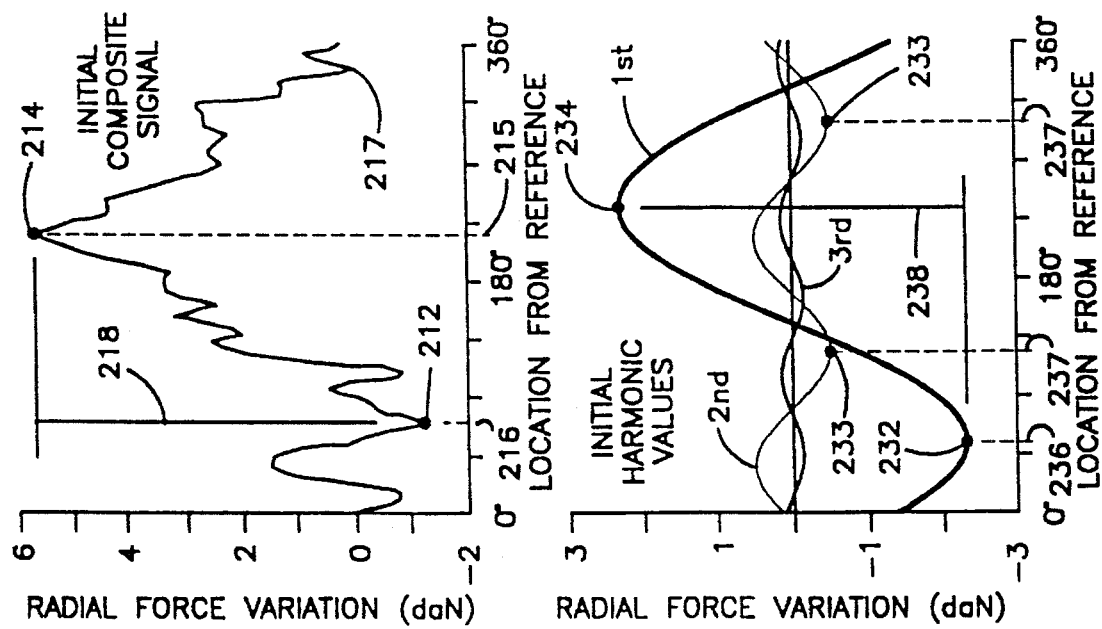
Fig.2
Fig.3

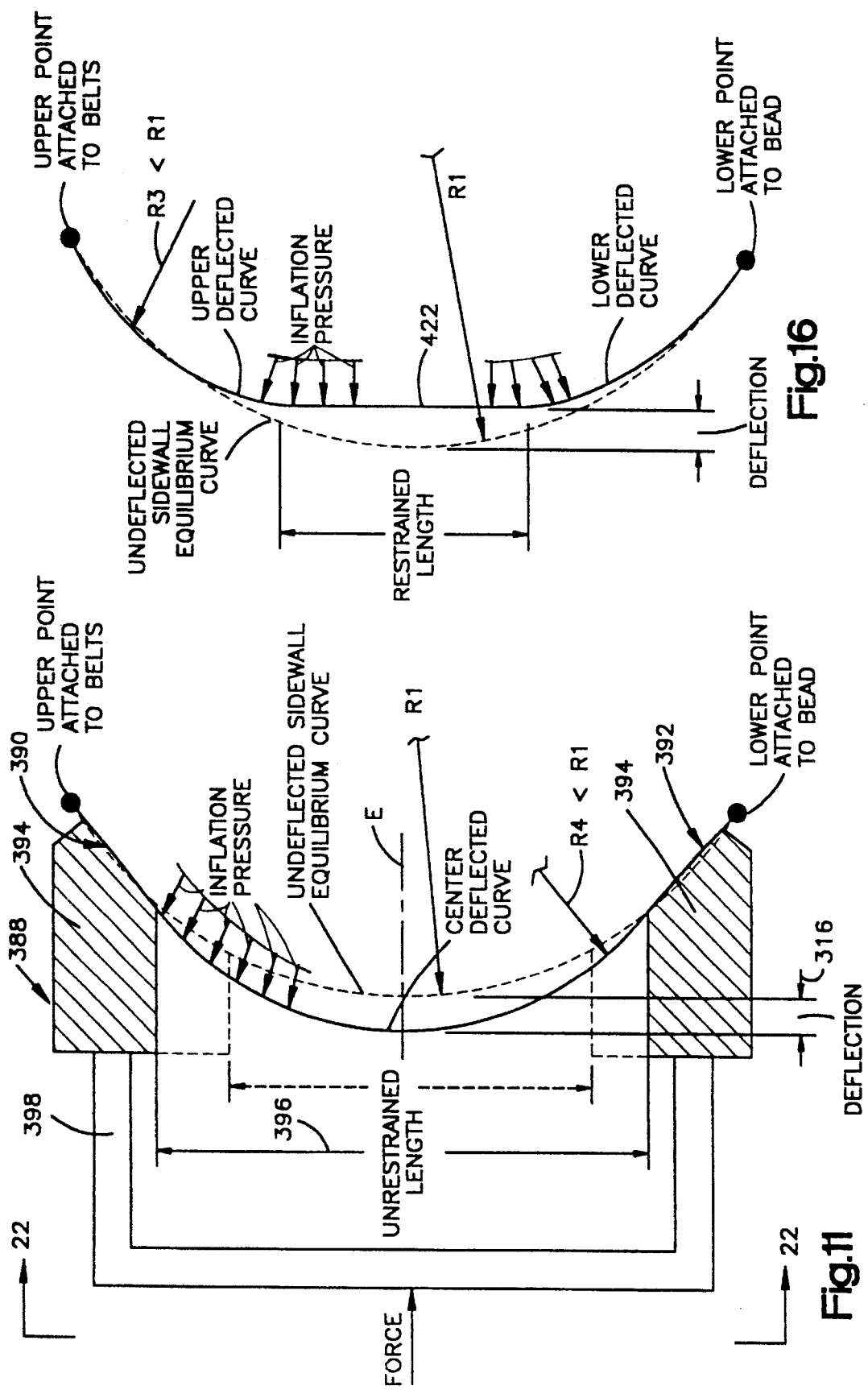

TIRE HAVING UNIFORMITY CORRECTION WITHOUT GRINDING

This application is a division of application Ser. No. 07/863,256, filed on Apr. 3, 1992, now U.S. Pat. No. 5,365,781.

BACKGROUND OF THE INVENTION

1. Technical Field

The present invention relates generally to a pneumatic vehicle tire, and to a method and an apparatus for correcting at least one uniformity characteristic in the tire. In particular, the present invention relates to correcting the uniformity characteristic in the tire, such as radial force variation and/or conicity, without grinding any part of the tire.

2. Description of the Prior Art

It is known in the tire industry that it is difficult to manufacture a toroidal shaped pneumatic radial tire consistently the same every time from sheet and/or strip material. A typical pneumatic radial tire includes a pair of axially spaced apart and circumferentially inextensible beads. A carcass ply extends between the beads and is attached to a respective bead at axially opposite end portions of the carcass ply. The carcass ply includes a plurality of parallel extending reinforcing members. The carcass ply is formed into a toroidal shape and has a belt package located radially outward of the carcass ply in a crown portion of the tire. Tread rubber and sidewall rubber are applied over the belt package and carcass ply, respectively.

After the tire is assembled and cured, the tire is typically tested for a uniformity characteristic. "Uniformity" is defined herein as what a "perfect" or "ideal" tire would yield for certain measured characteristics when tested during rotation. "Uniformity characteristic" is defined herein as a deviation in those certain characteristics from what the perfect tire would yield during the testing.

Testing a tire for a uniformity characteristic typically begins with mounting the tire in an inflated condition on a test spindle of a uniformity tester. A test wheel is moved into engagement with the tire to radially deflect a portion of the tire a predetermined amount. The position of the axis of rotation of the test wheel relative to the axis of rotation of the tire is then fixed by a locking mechanism. The test wheel is rotated to cause rotation of the tire. Sensors associated with the test wheel sense radial and lateral loads transmitted by the tire to the test wheel during rotation of the tire.

One uniformity characteristic test which is generally performed on the tire is a test for radial force variation. Radial force variation is typically expressed as a variation in the force against the test wheel which is sensed during rotation of the tire. Radial force variation can be represented by a combination of first harmonic radial force variation through an Nth harmonic radial force variation or a composite radial force variation. The Nth harmonic is the last harmonic in a Fourier Series analysis of the composite radial force variation which is deemed acceptable to accurately define the radial force variation. It is known in the tire and automobile industries that vehicle ride is generally most affected by the first harmonic radial force variation of the tire. The first harmonic radial force variation is often associated with "radial runout" of the tire. Radial runout is defined as a difference in the radius from the axis of rotation to the outer periphery of the tire tread around the tire.

Another uniformity characteristic test which may be performed on the tire is a test for conicity. Conicity is defined as the tendency of a rotating tire to generate a lateral force regardless of the direction of rotation of the tire. Conicity is expressed in terms of average lateral force generated during rotation in both directions of the tire against the load.

Such uniformity characteristics may be attributed to the manufacture of a tire from the sheet and/or strip material. The uniformity characteristics can simplistically be viewed as a deviation from perfect roundness of the outer circumference of the tire, as deviation from spindle load transmitted by a perfect tire during rotation (radial force variation) or as deviation from straight tracking during rotation (conicity). For example, the tread rubber of the tire may be thicker or thinner in one location around the outer circumference of the tire. There may also be areas of the tire having increased strength because of a doubling of a tire reinforcement, such as at the splice from sheet carcass ply material. Lack of bead concentricity of the tire may also be a problem. The beads of the tire may be not exactly concentric relative to the axis of rotation of the tire or the tread may not be concentric with the beads (radial runout). The carcass ply of the tire may be subjected to more or less localized stretch of the carcass reinforcing members during assembly of the tire. The molding and curing processes of the tire assembly could also create localized stretching of the carcass reinforcing members. The belt package of the tire may be axially displaced or conically shaped.

If the uniformity characteristic of the tire has a magnitude which is less than a predetermined relatively low minimum magnitude, which is deemed not to be detrimental to a vehicle ride or produce undesirable vibrations in the vehicle, the tire may be shipped to a customer. If the uniformity characteristic magnitude is greater than a predetermined maximum threshold magnitude, the tire is scrapped. If the uniformity characteristic magnitude is between the relatively low minimum magnitude and the maximum threshold magnitude, the tire may be suitable for correction.

Typically, prior art correction of a uniformity characteristic of a tire, such as radial force variation, included grinding of tread rubber about the outer circumference of the tire at a selected location and up to 180 degrees about the outer circumference of the tire. However, grinding of the tire has certain disadvantages. For example, grinding can contaminate a tire plant environment, reduce the useful tread life of the tire or may render the tire visually unappealing. Prior attempts at correcting a pneumatic tire uniformity characteristic without grinding are disclosed in U.S. Pats. Nos. 3,529,048; 3,632,701; 3,838,142; 3,872,208; 3,880,556; 3,945,277 and 5,060,510.

U.S. Pat. No. 3,529,048 discloses placing a tire on a fixture immediately after the tire is removed from a mold and before it is cooled. The tire is inflated to its recommended operating pressure. A radial load is applied to the tire and the tire is rotated for a time at least equal to the tire cure time. The flexing of portions of the tire allow components or portions of the components of the tire to "relatively move" before the tire is completely cured to yield uniform stresses in the components.

U.S. Pat. No. 3,632,701 discloses heating a tire after curing to a temperature elevated above an ambient temperature. The elevated temperature is maintained for about sixty minutes while the tire is inflated to a pressure of up to 50 psi. This obviously has drawbacks in a modern tire production plant because of the relatively long time required to correct the uniformity characteristic of the tire compared to a cure cycle time of less than thirty minutes for a passenger car radial tire.

U.S. Pat. No. 3,838,142 discloses subjecting selected sections of the tire to radiation to increase the modules of elasticity of those sections. U.S. Pat. Nos. 3,872,208 and 3,880,556 disclose applying heat to a portion of the inner surface of the tire. U.S. Pat. No. 3,945,277 discloses applying heat to the tire sidewalls during rotation of the tire in contact with rollers in order to "condition" the tire.

U.S. Pat. No. 5,060,510 discloses correcting radial force variation of a tire and rim assembly without grinding the tire tread. A pair of circumferential shims are placed between respective tire bead areas and mounting areas of the rim as a function of the measured radial force variation. Each shim has a varying thickness over its circumference. For a flat seat rim, the largest thickness portion of the shims are placed at the location of the largest amplitude of the radial force variation.

SUMMARY OF THE INVENTION

The present invention is directed to correcting a uniformity characteristic, such as radial force variation or a conicity, in a fully cured pneumatic tire and particularly in a radial pneumatic tire. The method and apparatus of the present invention accomplishes such correction without the drawbacks of the prior art methods which can be energy inefficient, costly and/or time consuming. The present invention is, thus, directed to an apparatus and a method for correcting at least one uniformity characteristic in the tire in a relatively short period of time and without grinding. The present invention is also directed to a tire resulting from the uniformity characteristic correction by such method and apparatus.

The method embodying the present invention is for correcting a uniformity characteristic in a cured tire. A signal is generated which is indicative of the magnitude of the uniformity characteristic and of the location on the tire to be corrected. A portion of at least one carcass reinforcing member is permanently deformed a predetermined amount as a function of the location and magnitude indicated by the signal.

The apparatus embodying the present invention for correcting a uniformity characteristic comprises means for generating a signal which is indicative of the magnitude of the uniformity characteristic and of the location on the tire to be corrected. The apparatus includes means for permanently deforming at least one carcass reinforcing member a predetermined amount as a function of the magnitude and location of the uniformity characteristic indicated by the signal to provide the correction.

Correction of the tire is typically performed when the magnitude of the uniformity characteristic is within a predetermined range of magnitudes. The reducing step and/or means preferably includes stretching at least a portion of the carcass reinforcing member beyond its elastic limit for a predetermined time. The stretching results in a permanent lengthening of the carcass reinforcing member as a function of the magnitude of the uniformity characteristic, but preferably by at least 0.1 percent.

The magnitude of the uniformity characteristic varies circumferentially around the tire as given by the signal. Stretching the carcass reinforcing members for proper correction must also vary circumferentially around the tire. Variable stretching is associated with a means for providing a variable tension in the carcass reinforcing members. This can be achieved by a tension applied to each individual carcass reinforcing member or by a method of restraining the tire and concurrently tensioning a plurality of carcass reinforcing members over a side or predetermined angular segment of the tire. The type and amount of restraint is a function of the uniformity characteristic, the magnitude location of the correction, the pressure or force applied, as well as the physical parameters of the tire.

Consider the signal to be indicative of a composite or total radial force variation. Total radial force variation may be analyzed to determine the first harmonic radial force variation or a predetermined other harmonic. A portion of the sidewall of the tire may be restrained a maximum amount at a location 180°, for the first harmonic, circumferentially spaced from the location indicated by the signal and a minimum amount, or not at all, at the location indicated by the signal. The sidewall may be linearly restrained to a gradually lesser amount in both circumferential directions from the location of maximum restraint toward the location of minimum restraint. Alternatively, non-linear restraint may be applied to the sidewall of the tire.

The minimum restraint permits a maximum amount of permanent deformation to at least one carcass reinforcing member at the location of minimum restraint. A gradually lesser amount of permanent deformation may then be provided to other carcass reinforcing members in both circumferential directions from the location of minimum restraint to a minimum amount of permanent deformation at the location of maximum restraint.

Restraining the sidewall or sidewalls of the tire can be accomplished by an annular restraint device having a planar side surface for engaging an annular portion of the sidewall. The radial length of engagement of the restraint device may be a relatively small percentage of the section height of the tire. Alternatively, another restraint device may be provided in which the radial length of engagement may be a relatively large percentage of the section height of the tire. The orientation of the restraint device relative to the mid-circumferential plane of the tire may be varied as a function of the magnitude of the radial force variation.

Conicity of the tire may be corrected by permanently deforming a portion of all carcass reinforcing members a substantially equal amount in only one sidewall of a tire indicated by the signal. Conicity may also be corrected by permanently deforming a portion of the carcass reinforcing members at the side of the tire indicated by the signal by an amount different than the permanent deformation applied to a portion of the carcass reinforcing members in the other side of the tire.

A method and apparatus for reducing the magnitude of a uniformity characteristic in a cured tire is also provided. The location on the tire to be corrected is determined. A pseudo radial runout is introduced to the tire as a function of the location to be corrected in order to offset the uniformity characteristic and thereby reduce the first harmonic magnitude of a resulting uniformity characteristic to a magnitude below a minimum threshold.

The corrected tire includes a pair of spaced apart and circumferentially inextensible beads. A carcass extends between the beads and has axially opposite end portions attached to a respective one of the beads. The carcass includes a plurality of parallel extending reinforcing members. At least one of the carcass reinforcing members has a portion permanently deformed beyond its elastic limit to reduce a uniformity characteristic of the tire. The carcass reinforcing members are preferably made from a polyester material. The tire may include a belt package located radially outward of the carcass in a crown portion of the tire. The permanently deformed portion of the carcass reinforcing member is preferably located in a sidewall of the tire. The portion of the carcass reinforcing member is permanently elongated by at least 0.1 percent.

BRIEF DESCRIPTION OF THE DRAWINGS

Further features of the present invention will become apparent to those skilled in the art to which the present invention relates from reading the following specification with reference to the accompanying drawings, in which:

FIG. 2 is a graphical representation of a composite radial force variation of a tested tire as a function of the angular location around the tire;

FIG. 3 is a graphical representation of the initial values of the first through third harmonics of a radial force variation of the tested tire;

FIG. 4 is a graphical representation of composite radial force variations of a tire having a first harmonic corrected according to the present invention, before and after running of the tire;

FIG. 5 is a graphical representation of the first through third harmonics of radial force variation after correction of the first harmonic of the tire;

FIG. 11 is a cross-sectional view of a portion of a carcass reinforcing member restrained at two radial locations according to an alternate embodiment restraint ring of the present invention;

FIG. 16 is a schematic representation of a portion of a carcass reinforcing member before and after restraining the sidewall according to the embodiment illustrated in FIG. 15;

DESCRIPTION OF PREFERRED EMBODIMENTS OF THE INVENTION

Figure 8:
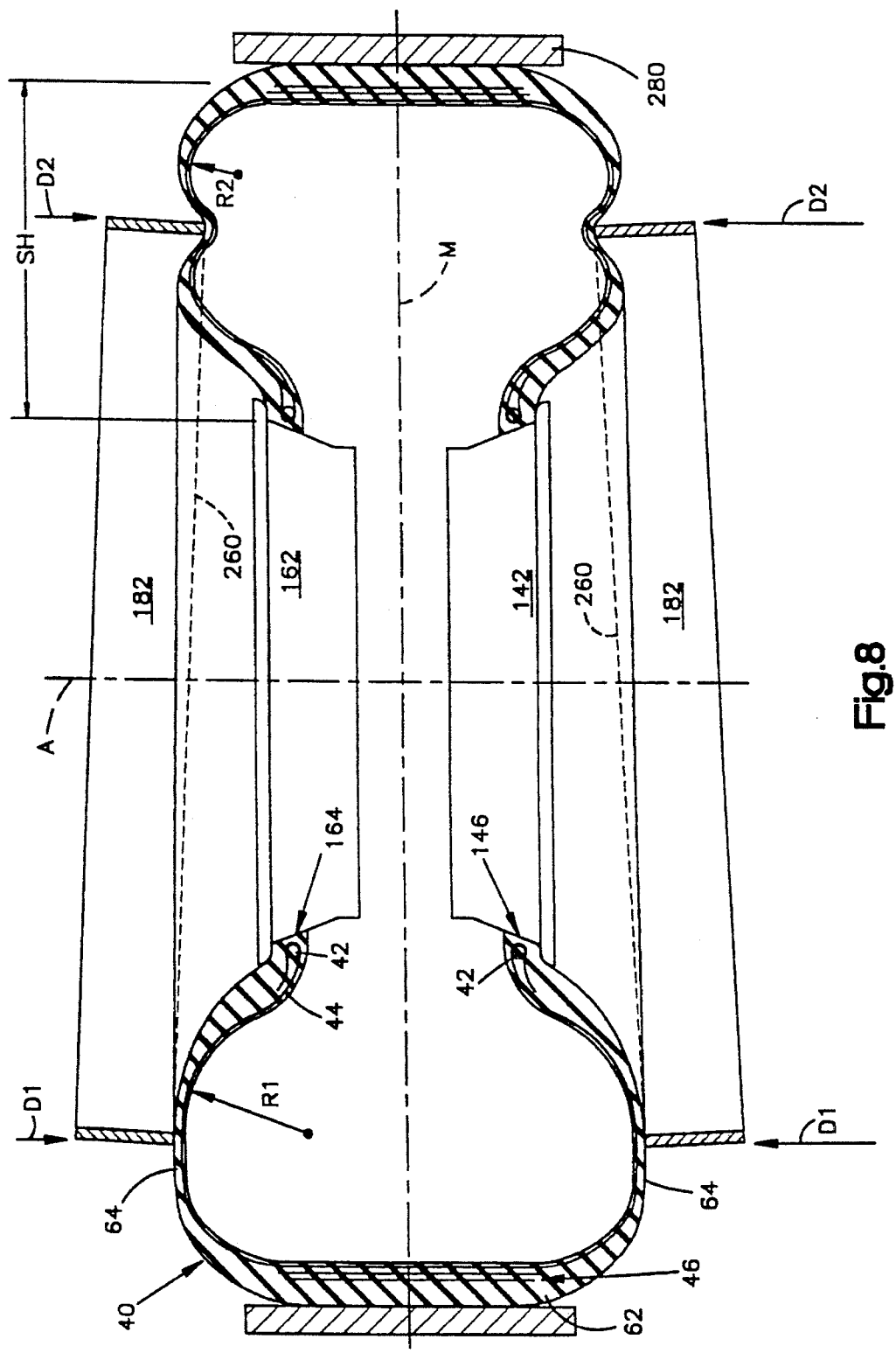
FIG. 8 is a cross-sectional view of a tire mounted in a portion of the apparatus embodying the present invention and illustrating restraint of the sidewalls of the tire.
Figure 9:
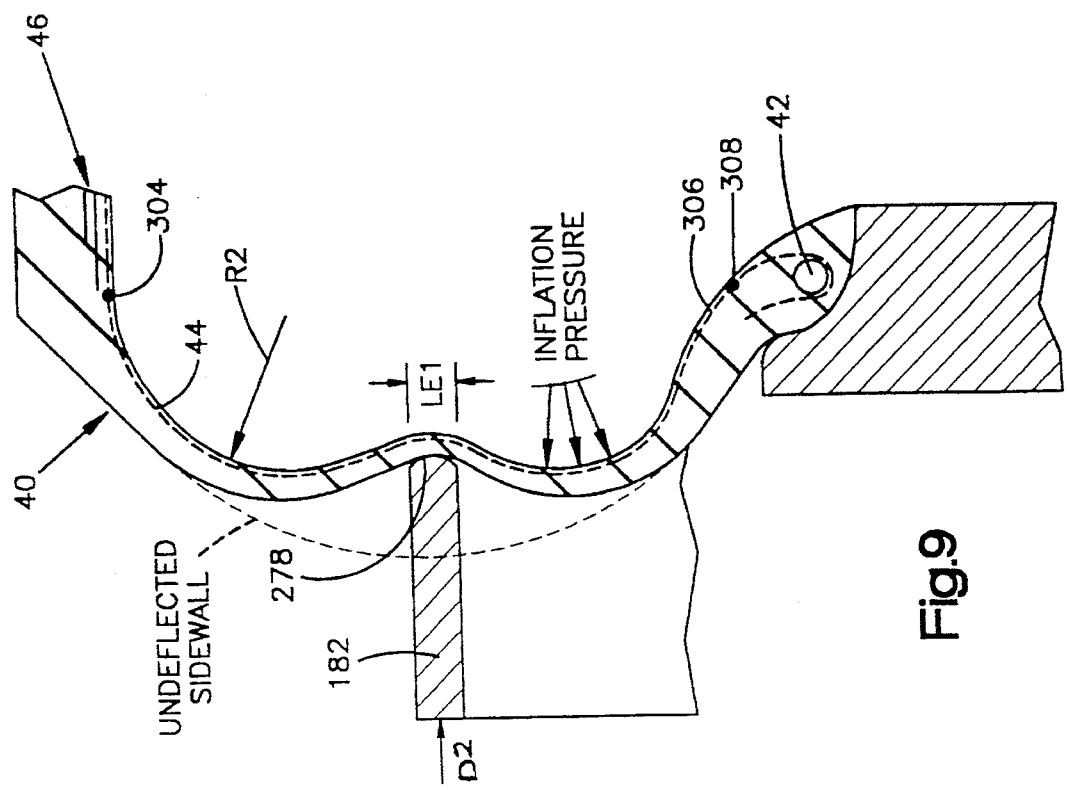
FIG. 9 is an enlarged cross-sectional view of a portion of the tire and apparatus illustrated in FIG. 8.

A radial pneumatic tire 40 for uniformity characteristic correction in accordance with the present invention is illustrated in FIGS. 8 and 9. The tire 40 is rotatable about a longitudinal central axis A. The tire 40 includes a pair of beads 42 which are substantially inextensible in a circumferential direction. The beads 42 are spaced apart in a direction parallel to the axis A. Circumferential is defined as being substantially tangential to a circle having its center at axis A and contained in a plane parallel to the mid-circumferential plane M of the tire.

A carcass ply 44 extends between each of the respective beads 42. The carcass ply 44 has a pair of axially opposite end portions which extend around the respective bead 42. The carcass ply 44 is secured at the axially opposite end portions to the respective bead 42. The carcass ply 44 includes a plurality of substantially parallel extending reinforcing members each of which are made of a suitable configuration and material, such as several polyester yarns or filaments twisted together. It will be apparent that the carcass ply 44 is illustrated as a single ply but may include any appropriate number of carcass plies for the intended use and load of the tire 40. It will also be apparent that the reinforcing member may be a monofilament or any other suitable configuration or material.

The tire 40 illustrated in FIGS. 8 and 9 also includes a belt package 46. The belt package 46 includes at least two annular belts. One of the belts is located radially outwardly of the other belt. Each belt includes a plurality of substantially parallel extending reinforcing members made of a suitable material, such as a steel alloy. The tire 40 also includes rubber for the tread 62 and sidewalls 64. The rubber may be of any suitable natural or synthetic rubber, or combination thereof.

Figure 1:
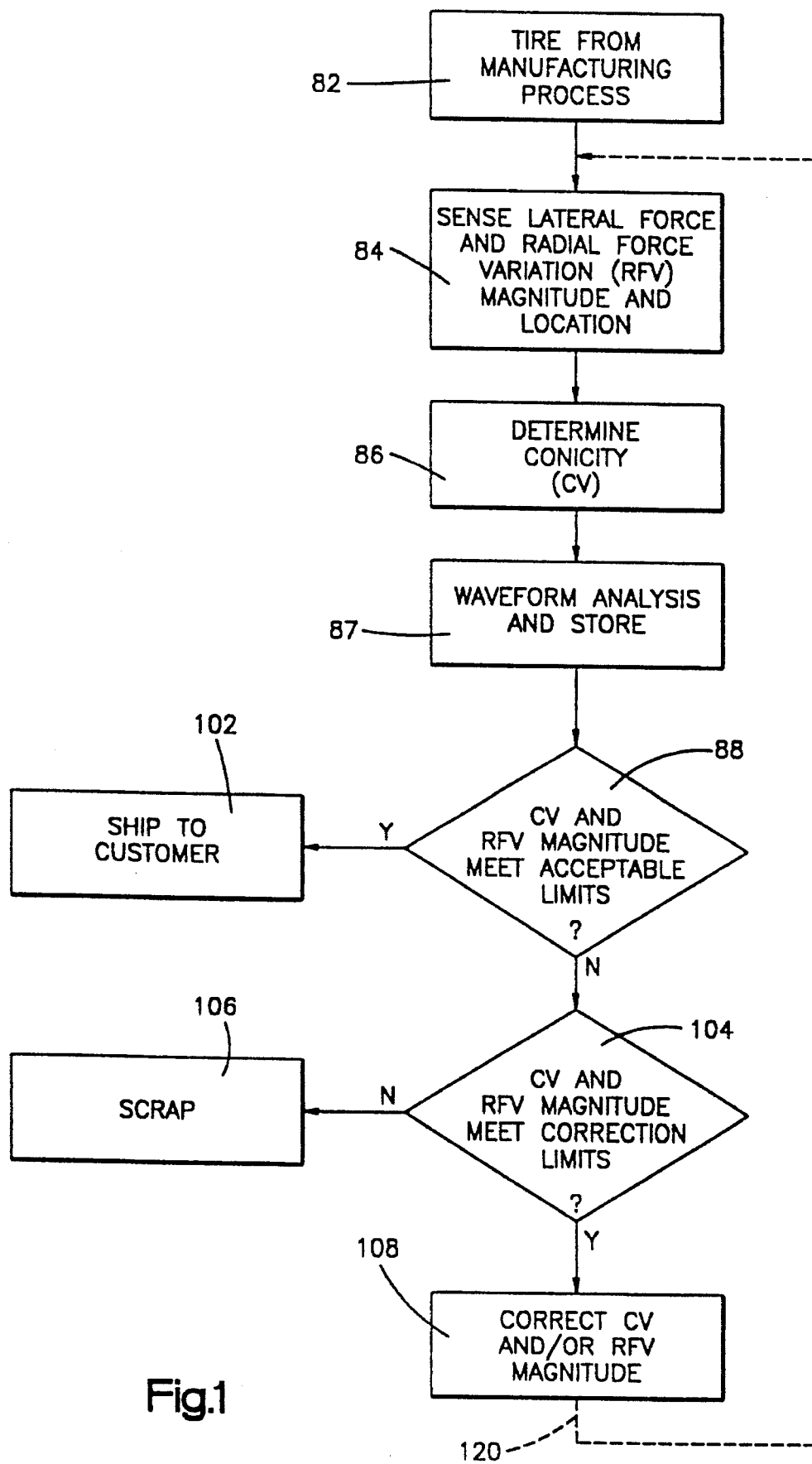
FIG. 1 is a flow diagram of process operations for testing and analyzing the uniformity characteristics of a tire.

In the tire 40, uniformity characteristics may result from the assembly and curing operations in a tire plant. For example, the tire 40 is tested after curing and cooling for certain uniformity characteristics, such as radial force variation, ply steer and/or conicity. FIG. 1 is a flow diagram of the processes that the tire 40 may undergo after it has been assembled, cured and cooled in operation 82. The tire 40 is placed on a uniformity tester (not shown). The uniformity tester is well known in the tire manufacturing art. The tire uniformity tester is available from a supplier such as Akron Standard, Akron, Ohio.

The tire 40 is mounted in an inflated condition to its normal recommended operating pressure on a mounting device which simulates a vehicle rim. The tire 40 is then engaged by a test wheel which loads the tire to an appropriate predetermined radial load. The relative distance between the axes of rotation of the tire 40 and of the test wheel (center-to-center distance) is then fixed. The test wheel is rotated to impart rotation to the tire 40. Sensors which are operatively connected with the test wheel sense radial force and lateral force variations from the load applied to the tire 40 in operation 84. The test parameters which may be adjusted for the test include applied load, inflation pressure and rolling radius of the tire 40. The parameters are dependent upon the type of tire 40 and the particular size tire tested. For example, test parameters for a 205/70R15 passenger car tire are a 502 decaNewtons (daN) load, 30 psi inflation pressure and the center-to-center distance fixed when the radial load of 502 daN is reached.

The tendency for the tire 40 to generate a lateral force in a direction along the axis A during rotation of the tire 40 when loaded against the test wheel in one direction is also sensed in operation 84. This is termed lateral force variation. The tire 40 is then rotated in the opposite direction and another lateral force variation is sensed. The sensing of the magnitudes of the lateral force variations and the magnitude around the tire of the radial force variation is performed in operation 84. In operation 86, the conicity of the tire 40 is determined. Conicity magnitude is defined as the average of lateral offsets when the tire 40 is rotated in one direction and then rotated in the opposite direction. Lateral offset is defined as the mean of the peak-to-peak lateral force variation when the tire is rotated in one direction about its rotational axis when loaded.

In FIGS. 2 and 3 an initial radial force variation of the uncorrected tire 40, as tested, is graphically illustrated to represent corresponding electrical signals. The radial force variation as a function of circumferential position on the tire 40 is represented by a wave form, illustrated in FIG. 2, which may be decomposed into a number of desired harmonic wave forms, as illustrated in FIG. 3. In operation 87 (FIG. 1), the harmonic wave forms are determined in a computer (not shown) by a Fourier analysis of the radial force variation wave form sensed during rotation of the loaded tire 40. In FIG. 3, for clarity of illustration purposes, only the uncorrected first through third harmonic radial force variations in decaNewtons of force variation from test load during rotation of the tire 40 are graphically represented as a function of angular location around the tire from a reference location. It is apparent that the composite wave form is better represented by a greater number of harmonic wave forms. The analysis and wave forms are stored in the computer and referenced to a particular tire 40 in operation 87.

The composite radial force variation and conicity are typically determined by the tire uniformity tester. Once the conicity and radial force variation magnitudes are determined, they are compared to a respective minimum acceptable threshold limit in operation 88 (FIG. 1). If the absolute value of the conicity magnitude and radial force variation magnitude are less than a respective predetermined minimum threshold magnitude limit, the tire 40 is deemed acceptable and no further processing of the tire is needed. The tire 40 is then typically shipped to a customer as indicated in operation 102.

If the tire 40 has a magnitude for conicity (absolute value) or radial force variation greater than the corresponding acceptable minimum threshold magnitude limit, another comparison is performed in operation 104. If the conicity (absolute value) or radial force variation magnitudes are greater than a relatively large maximum threshold magnitude limit, the tire 40 is deemed uncorrectable. If the tire 40 is uncorrectable it is scrapped in operation 106.

If the tire 40 falls within a predetermined range of magnitudes for conicity (absolute value) and/or radial force variation, it is forwarded for uniformity characteristic correction in operation 108. For example, if the conicity (absolute value) and/or radial force variation magnitudes are greater than the acceptable minimum threshold magnitude limit for shipping to a customer but less than the relatively large maximum threshold magnitude limit for scrapping, the tire 40 may be corrected at a uniformity correction station. After the tire 40 is corrected and allowed to sit for a period of time, for example twenty four hours, it may be again tested as indicated by the dashed line 120. This "sit period" is sufficient time to take into consideration any viscoelastic relaxation that occurred in the tire 40 after correction. If the corrected tire 40 has uniformity characteristic magnitudes below the minimum acceptable threshold limits it is shipped to the customer. If the tire 40 does not have an acceptable uniformity character magnitude, it may be scrapped or may be again corrected. Preferably, after the tire 40 is corrected once it will be below the acceptable minimum threshold magnitude limit and shipped to the customer.

Figure 6:
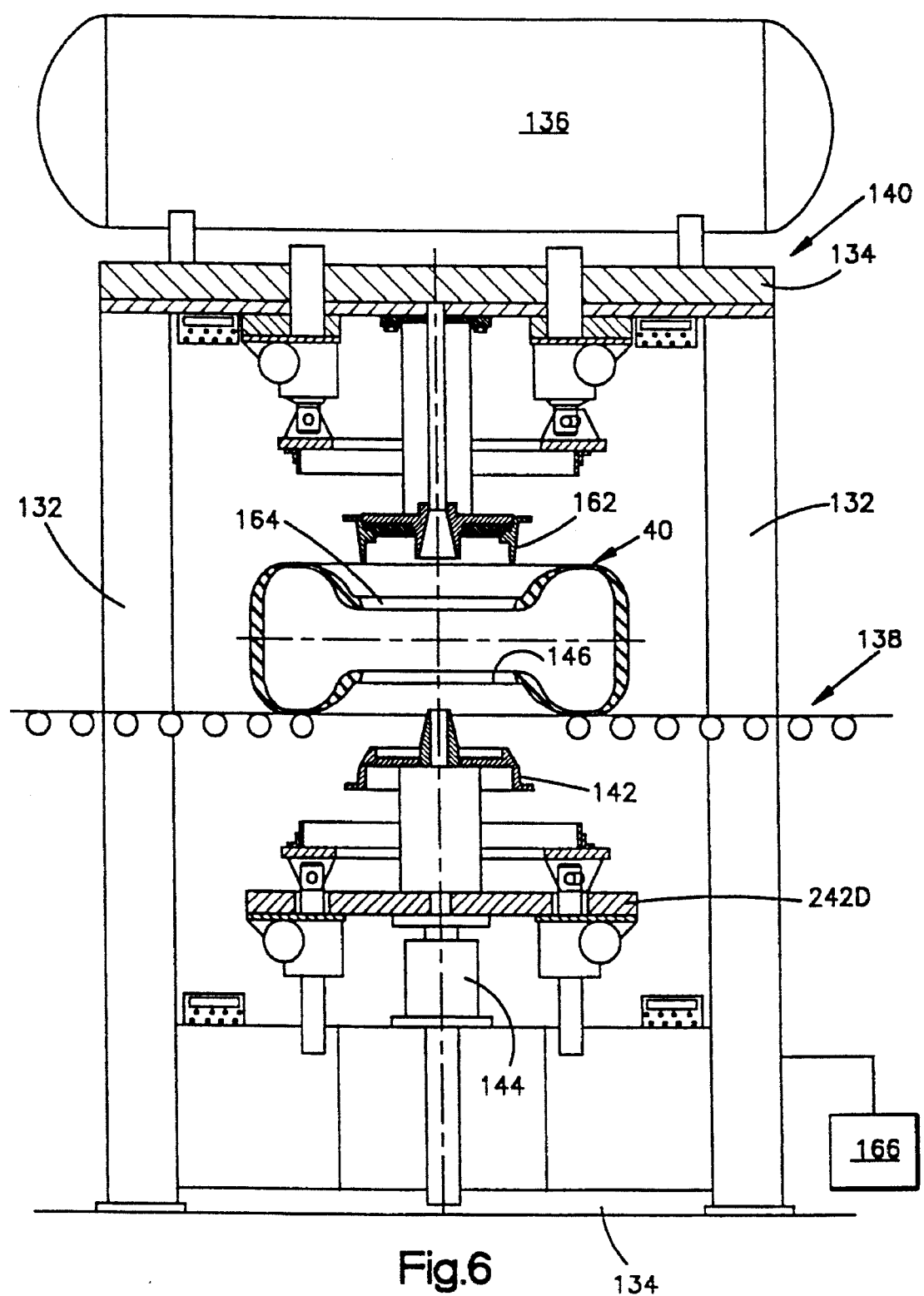
FIG. 6 is a elevational view of an apparatus embodying the present invention for correcting a uniformity characteristic of a tire.

A tire 40 that is to be corrected is transported to a correction station 140 embodying the present invention, as illustrated in FIG. 6. The correction lower station 140 includes vertical frame members 132 as well as upper and cross members 134. An air tank 136 may be mounted to the upper cross member 134. The mode of transportation of the tire 40 may be manual or automated on a conveyor system 138. The tire 40 is initially supported in the correction station 140 in the position illustrated in FIG. 6. It should be apparent that the correction station 140 could be a stand alone operation or be incorporated into a tire uniformity test machine for a combination test and correct operation.

Figure 7:
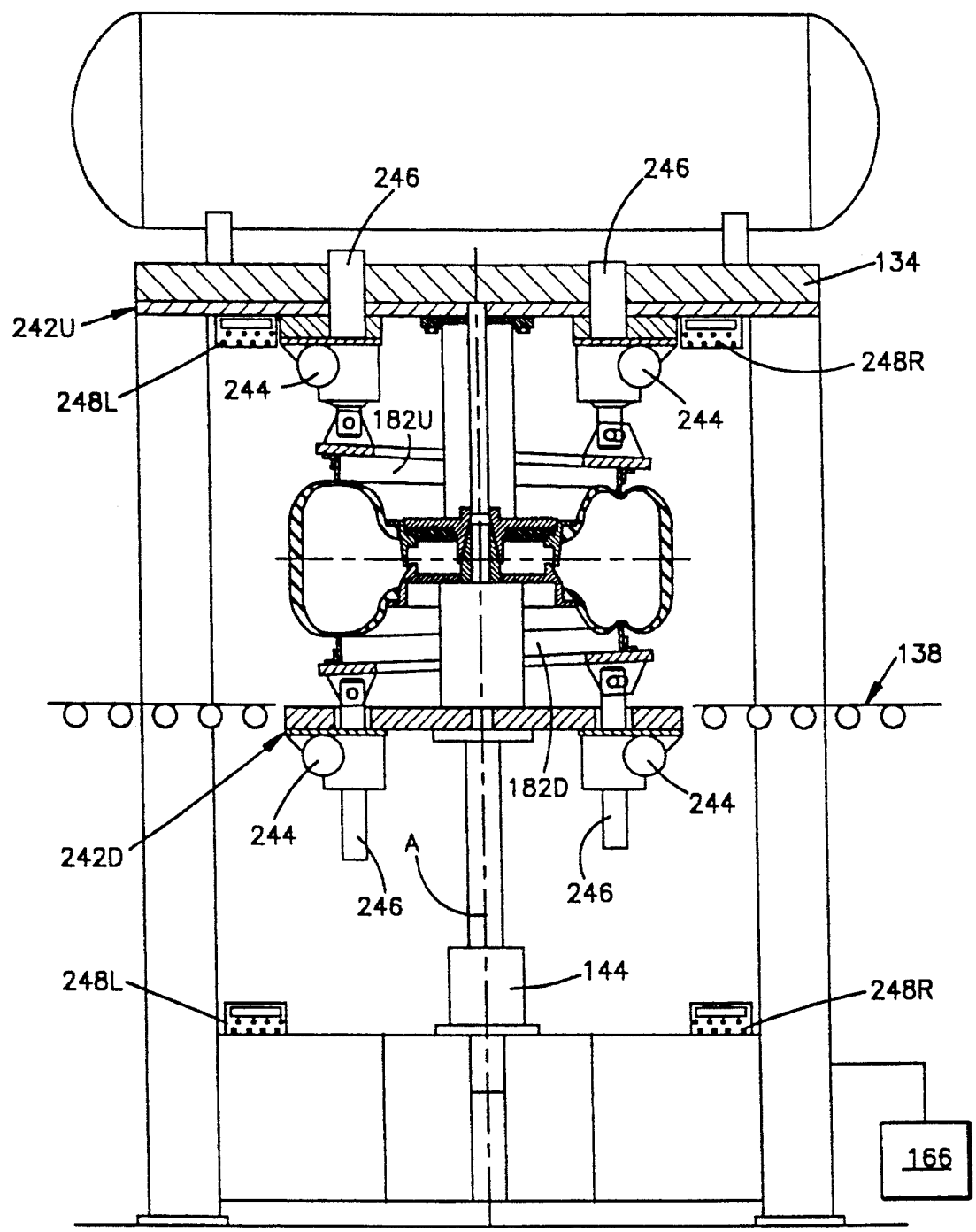
FIG. 7 is a view of the apparatus in FIG. 6 with parts moved to different positions illustrating use of the method and apparatus.

A lower simulated rim mounting 142 is moved upwardly by a main actuator 144 from the position illustrated in FIG. 6 towards the position illustrated in FIG. 7. The lower simulated rim mounting 142 (FIG. 6) is brought into axial engagement with the lower bead area 146 of the tire 40. The main actuator 144 continues to raise the tire 40 away from the conveyor 138. The tire 40 then is forced against the upper simulated rim mounting 162 at the upper bead area 164, as illustrated in FIGS. 7 and 8. The tire 40 is inflated with fluid pressure, such as air, to a pressure sufficient to seat the bead areas 146,164 of the tire 40 against the simulated rim mountings 142,162. Then the tire 40 is deflated to a relatively low pressure which is above the surrounding ambient atmospheric pressure and which pressure is approximately equal to one-tenth the recommended operating pressure of the tire.

Once the tire 40 is located in the correction station 140, a programmable controller 166 (FIG. 6) operably connected with the correction station 140 and computer determines, in operation 202 (FIG. 14) by a variety of inputs, if conicity correction, radial force variation correction or both is to be performed. At the tire correction station 140 the tire 40 has an indicator, such as a bar code label or an infrared ink identification which is read and indicates information about the tire 40 to the controller 166. Such information may be, for example, information related to reference measurements (i.e., soft spot or hard spot) a unique identifier, such as a serial number which is communicated to the controller 166. The controller 166 can then input data associated with that serial number, such as the type of uniformity characteristic to be corrected as well as the wave forms and analysis that were stored in the computer in operation 87 (FIG. 1). Once this information is known to the controller 166 the tire 40 located in the correction station 140 can be corrected.

If the controller 166 and control program determine that radial force variation of the tire 40 is to be corrected in operation (FIG. 14) the controller and control program determine which radial force variation, composite or harmonic, is to be corrected in operation 208. If for example, an operator or the control program has indicated, in operation 208, that the first harmonic of the radial force variation is the desired harmonic to be corrected, operation 220 sets input parameters, to be used in a later operation, indicating the first harmonic. Alternatively, operation 220 can be programmed to select the harmonic of the radial force variation to be corrected as a function of a predetermined parameter, such as the harmonic with the greatest magnitude. Once it is determined that one or more harmonics of the radial force variation is to be corrected, operation 221 analyzes or reads the stored harmonic wave forms as illustrated in FIG. 3.

If the first harmonic of the radial force variation is to be corrected as determined in operation 220, an analysis of the first harmonic wave form (if it has not been analyzed already) is performed in operation 221. The analysis may have already been done in operation 87 (FIG. 1) and stored for use at this time. The analysis will now be described in detail for a better understanding of such analysis. The analysis can be better understood with reference to FIG. 3. In FIG. 3, the initial first harmonic wave form signal for the uncorrected tire 40, as tested, is illustrated. Only two radial force variation input parameters are required to initiate the first harmonic correction. The magnitude 238 and the location 236 from a reference location provide these parameters. The magnitude is the difference between the soft spot 232 magnitude and the hard spot 234 magnitude. The location is the angular position 236 of the soft spot 232 from the reference. These two parameters are obtained in operations 221 and 222 of FIG. 14, and/or operation 87 of FIG. 1.

This peak-to-peak magnitude 238 may be graphically represented as, for example, approximately 4.55 daN, of first harmonic desired correction (FIG. 3). If, for example, the tire 40 has four daN first harmonic peak-to-peak radial force variation or less, and which four daN may be the minimum threshold acceptable limit for magnitude, the tire 40 would be shipped to the customer. If the relatively large maximum threshold limit for scrapping the tire 40 is greater than or equal to, for example, 10 daN first harmonic peak-to-peak magnitude, the tire would be scrapped. Here it is apparent that the 4.55 daN approximate peak-to-peak magnitude 238 of first harmonic radial force variation is within the predetermined range of peak-to-peak magnitudes of four daN to ten daN and, thus, the tire 40 is suitable for correction.

Figure 14:
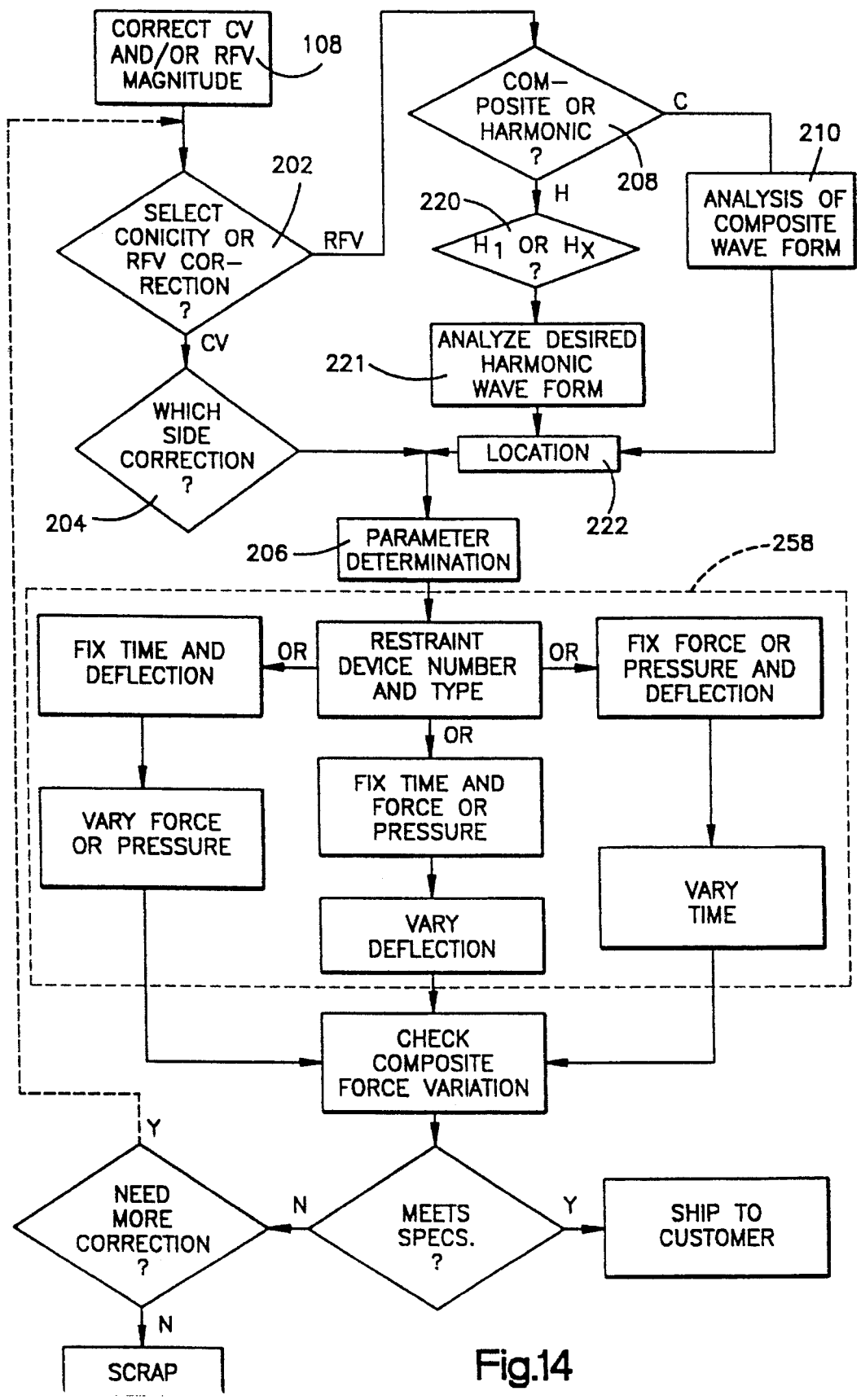
FIG. 14 is a flow diagram of the correction method embodying the present invention.

The analysis operation 221 also includes the location 236 of the first harmonic soft spot 232 around the tire 40 as an angular position from a physical reference on the tire 40. Thus, the location 236 of the first harmonic soft spot 232 is known to operation 222 (FIG. 14). The magnitude 238 and location 236 of the soft spot are used as input parameters to determine control parameters for the correction operation 258.

Correction of the uniformity characteristic is accomplished in operation 258 (FIG. 14) by permanently deforming at least one, and preferably many, carcass reinforcing members. The stretching is done preferably by applying relatively high inflation pressure to the interior of the tire 40 for a predetermined time. Input parameters are preferably used in operation 206 to determine control parameters for the correction operation 258. The control parameters are known to the controller 166 before the correction operation 258 is initiated. The input parameter of magnitude 238 affects the determination of control parameters such as deflection, time and pressure (or force) which are applied to the tire 40. The input parameter of location 236 (FIG. 3) of the soft spot affects the positioning of the tire 40 in the correction station 140. Other input parameters affecting the control parameter such as deflection, time and pressure applied to the tire 40 include the type and properties of material of the carcass reinforcing member. An example of properties include diameter, pitch and number of filaments used in the carcass reinforcing member. Materials of the carcass reinforcing member such as nylon and polyester are readily adaptable to correction by the present invention. Materials such as steel, Kevlar and rayon are not as easily permanently elongated and may require higher pressure or longer hold time.

A signal is generated by the controller 166 which is indicative of at least the magnitude 238 (FIG. 3) of correction desired and the angular location 236 from a reference on the tire 40 to be corrected. The signal may be hydraulic, pneumatic or preferably electronic. When the tire 40 is delivered to the correction station 140, the orientation of the tire may be accomplished relative to a known location on the correction station. For example, as illustrated in FIG. 6 if a first harmonic radial force variation correction is needed the location 236 of the first harmonic soft spot 232 is positioned at the far left hand side of the correction station 140, as viewed in FIG. 6. This positioning can be done by first marking the soft spot on the tire 40 relative to the physical reference of the tire 40 an angular amount equal to the location 236 in degrees.

With the tire 40 properly located and initially inflated, the correction station 140 is then further activated to assume the position illustrated in FIG. 7. The correction station 140 includes at least one restraint ring 182 which is brought into engagement with at least one corresponding sidewall of the tire 40. The number and type of restraint rings 182 brought into engagement with the sidewall or sidewalls of the tire 40 is determined as a control parameter in operation 206 as a function of the type correction desired in operation 258. If the first harmonic of radial force variation is to be corrected, then both the upper restraint ring 182U and lower restraint ring 182D engage the respective sidewalls of the tire 40.

Figure 20:
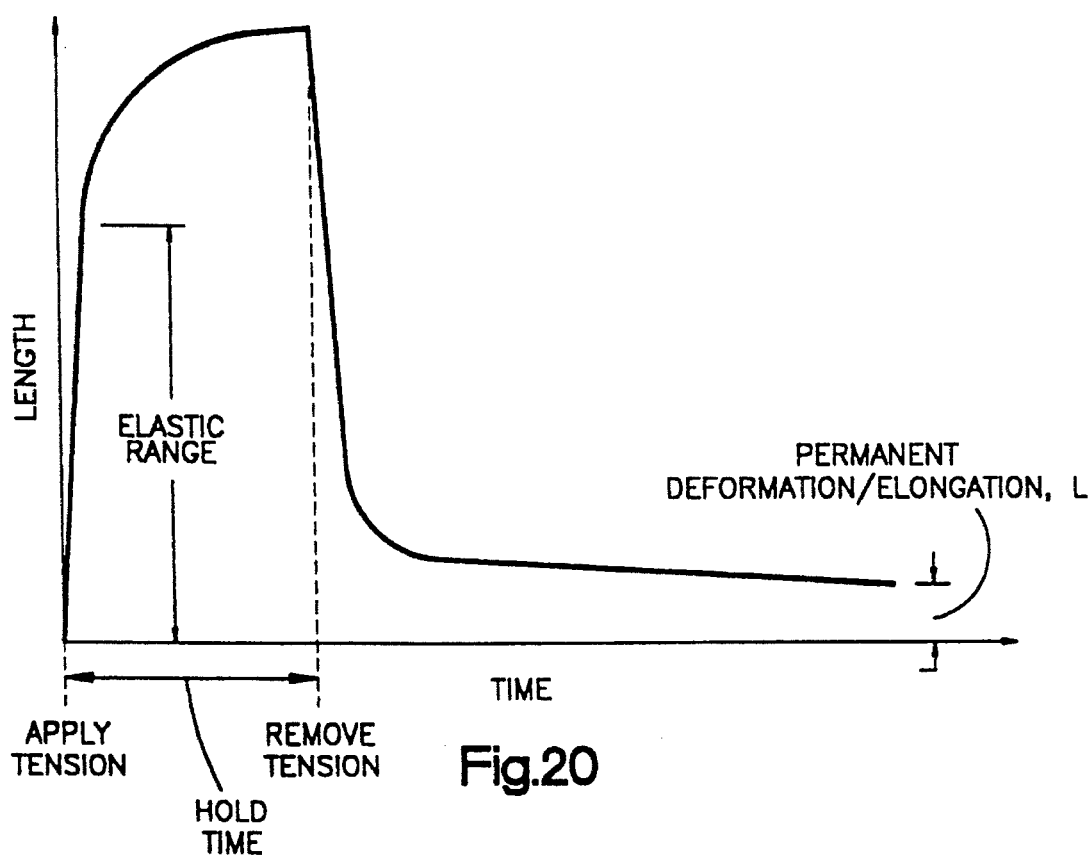
FIG. 20 is a graphical representation of the behavior of a portion of a carcass reinforcing member stretched as a function of time.

Correcting a first harmonic radial force variation includes inflating the tire 40 to a pressure above the recommended operating pressure of the tire 40 as a function of input parameters while restraining a portion of the sidewall to control the distribution of the correction around the tire. Stretching and permanently lengthening a portion of the carcass reinforcing member at different locations around the tire can correct the uniformity characteristic of the tire 40. Permanent deformation or elongation L is achieved by stretching a carcass reinforcing member beyond its elastic limit and holding it for a predetermined time, as illustrated in FIG. 20. The distribution of the amount of lengthening is controlled by restraining the sidewall of the tire 40 by an amount that varies around the circumference of the tire. This varying circumferential stretching is a function of the uniformity characteristic being corrected and other parameters.

Restraint rings 182 (FIG. 8) engage the sidewalls with different axial displacements D1,D2 to impart a different radius of curvature R1,R2 to the portion of the carcass reinforcing member 306 (FIG. 9) in each of the sidewalls.

The restraint rings 182 are used preferably only when inflation pressure is used for correction. The radius of curvature R2 in a maximally restrained portion of the tire 40 corresponding to displacement D2 is significantly less than radius of curvature R1 in the minimally restrained portion of the tire corresponding to displacement D1. Different radii of curvature provide different tension values in respective carcass reinforcing members.

The maximum amount of restraint to be applied for first harmonic radial force variation correction is at the first harmonic hard spot 234 on the tire 40 at a location 180° away from the location 236 of the first harmonic soft spot 232 indicated by the signal. The maximum restraint occurs at the location of maximum axial displacement D2 relative to the mid-circumferential plane M of the tire 40 which is to the far right in the correction station 140, as viewed in FIG. 7. A minimum amount of restraint, or no restraint at all (i.e. a gap) is applied to the sidewalls of the tire 40 at the location of the first harmonic soft spot 232 indicated by the signal and known to the controller 166 and correction station 140. The minimum restraint occurs at the location of minimum axial displacement D1 relative to the mid-circumferential plane M of the tire 40. This is at the far left of the correction station, as viewed in FIG. 7. More correction to the tire 40 occurs at the location of minimum restraint and relatively less (or no) correction occurs at the location of maximum restraint.

Figure 10:
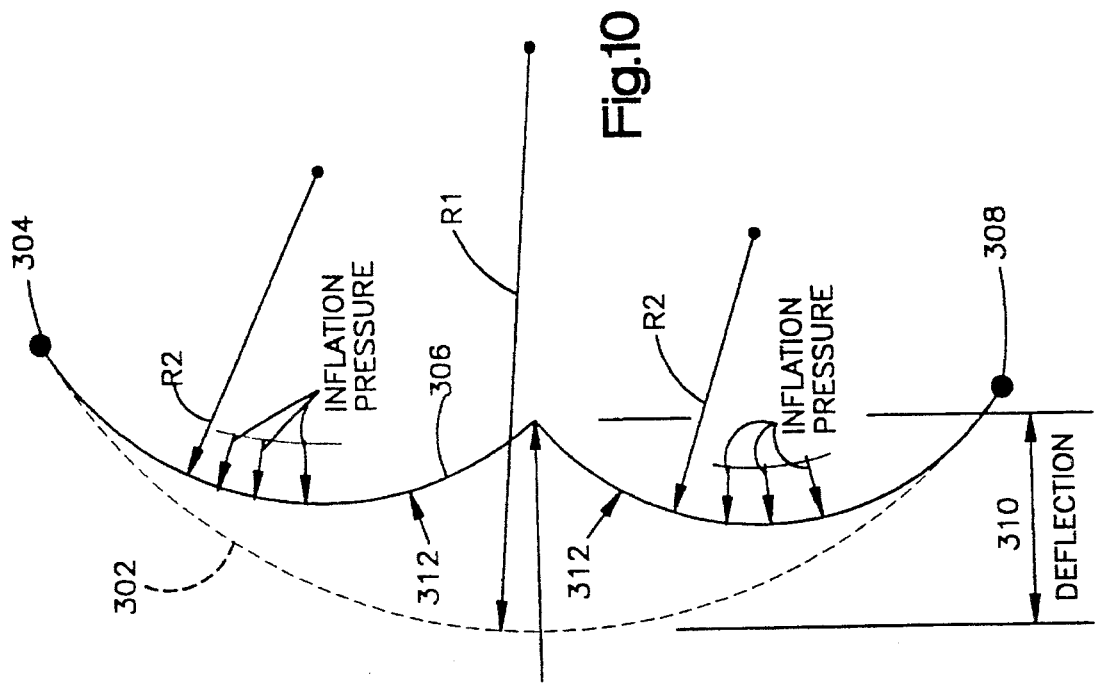
FIG. 10 is a schematic representation of a sidewall portion of a carcass reinforcing member in FIG. 9, before and after maximum restraint of the sidewall.

FIG. 10 is a schematic illustration of one carcass reinforcing member 306 being corrected according to the preferred embodiment of the present invention. A portion 302 of the carcass reinforcing member 306 is illustrated in FIG. 10 by a dashed line prior to being restrained. This portion 302 of the carcass reinforcing member 306 has an upper end point 304 at which load in the carcass reinforcing member is transmitted to the belt package 46 of the tire 40. The portion 302 of the carcass reinforcing member 306 has a lower end point 308 in the area of the bead 42 (FIG. 9) at which load in the carcass reinforcing member is transmitted to the bead of the tire 40. The deflected portions 312 of the portion 302 of the carcass reinforcing member 306 are illustrated in FIG. 10 in solid line. The deflection distance 310 is illustrated in FIG. 10 to correspond to the maximum amount of restraint discussed above in terms of deflection D2.

In the deflected portions 312 of the carcass reinforcing member 306 it will be apparent that the original or unrestrained radius of curvature R1 of the carcass reinforcing member has changed and is now a relatively smaller radius of curvature R2 in two locations. Physically the smaller radius R2 of portion 312, when the interior of the tire 40 is subjected to the same relatively high inflation pressure, such as 100 psi or 7 bars, will not be permanently elongated the same amount as the unrestrained portion 302 of the carcass reinforcing member 306 having the relatively larger radius of curvature R1. The relationship between tension in the carcass reinforcing member 306, radius of curvature in the reinforcing member 306 and inflation pressure in the tire 40 can be represented by the formula $T=R \cdot P$, where T is the tension force in the portion 302 of the carcass reinforcing member 306, R is the radius of curvature of the portion 302 or 312 of the carcass reinforcing member 306 and P is the internal inflation pressure in the tire 40 causing tension in the portion 302 of the carcass reinforcing member 306. Thus, it will be apparent that for a constant inflation pressure P, the larger the radius of curvature R of the portion 302 of the carcass reinforcing member 306, results in a relatively higher the tension T acting on that portion of the carcass reinforcing member. Thus, the higher tension in the portion 302 of the carcass reinforcing member 306 generally results in a relatively greater elongation above the elastic limit of the material which results in permanent elongation. The larger radius of curvature R1 in the portion 302 occurs at the location of minimum restraint around the tire 40 with a planar ring restraint device.

The restraint rings 182 may be of any configuration desired that is suitable for the type correction to be performed and as a function of the parameters determined in operation 206. For example, as illustrated in FIG. 8 a pair of restraint rings 182 are brought into engagement with the sidewalls of the tire 40 from axially opposite sidewall sides. The restraint difference is accomplished at the correction station 140 by axially moving the restraint rings 182 different amounts relative to the mid-circumferential plane M of the tire 40 at diametrically opposite regions of the tire. The axial movement of the restraint rings 182 is performed at the far left and far right in the correction station 140 by two pairs of actuators 246 (FIG. 7). The lower restraint ring 182D is supported at diametrically opposed end portions by a pair of actuators 246, each of which is driven by a respective motor 244. The lower actuators 246 are movable axially relative to a lower support 242D. The support 242D has the motors 244 attached directly thereto. Upon actuation of one of the motors 244, an associated actuator 246 moves the lower restraint ring 182D axially toward or away from the tire 40 in a direction parallel to the axis of rotation A of the tire. The upper restraint ring 182U is supported and moved similarly relative to the upper cross member 134 and support 242U.

The controller 166 and control program determine the amount of restraint or displacement needed at the location 236 of the first harmonic soft spot 232 of the tire 40 as a control parameter in operation 206. The control parameters are preferably determined by a look up table in operation 206 as a function of the magnitude 238 of correction to be applied to the tire 40 and other input parameters. The look up table can be constantly updated to reflect the history of previously corrected tires. The amount of restraint is defined by the amount of axially inward deflection applied to a sidewall of the tire 40. For example, the maximum amount of desired deflection D2 at the hard spot may be 15 millimeters as determined by the controller 166 and control program in operation 258. The sidewalls of the tire 40 on the right side, as viewed in FIG. 7, each are deflected axially 15 millimeters inwardly. This may be done manually or under controller 166 and control program direction and verified by digital output display 248R to indicate 15 millimeters of deflection D2. The minimum amount of restraint is applied to the sidewalls on the far left, as viewed in FIG. 7. For example, the minimum amount of restraint may be 0 to 5 millimeters deflection D1 as verified in the digital output displays 248L or may even be a gap of 0 to 10 millimeters. It will be apparent that the restraint rings 182 are tilted relative to the mid-circumferential plane M of the tire 40 to be closer together at the far right of the correction station 140, as viewed in FIG. 7. If a gap is initially provided, it will generally close by the sidewall contacting the restraint ring 182 as the tire 40 is inflated.

The maximum amount of deflection may be 15 millimeters in the axial direction. This means that each sidewall of the tire 40 is deflected a distance D2 axially inwardly against the relatively low initial inflation pressure, such as 3 to 5 psi. The minimum amount of restraint may be 0 to 5 millimeters of axial deflection D1 of the sidewall at the location 236 of the first harmonic soft spot (FIG. 3). The inflation pressure of the tire 40 is then raised significantly to a predetermined pressure above the recommended operating pressure of the tire, for example 100 psi or 7 bars, and held for a predetermined hold time. The minimum predetermined pressure is preferably in the range of two to three times the operating pressure of the tire 40. The predetermined hold time may be, for example, 10 seconds but will be considerably shorter than a cure cycle period. The minimum predetermined hold time is preferably at least one second. The input parameters as to amount of deflection, inflation pressure and hold time can be selected and varied by the controller 166 and control program in operations 258 (FIG. 14) as a function of the magnitude of uniformity characteristic correction needed, the size of the tire, the properties of the tire and the intended application of the tire.

This relatively high predetermined pressure forces the carcass reinforcing members 306 (FIG. 9) of the tire 40 to react to the elevated internal pressure and increase the tension in each carcass reinforcing member which results in lengthening. This increased tension and lengthening, when held even for a relatively short period of time above the elastic limit of the carcass reinforcing member 306, as illustrated in FIG. 20, results in the permanent deformation L by stretching of the carcass reinforcing members 306. The carcass reinforcing members 306 which have no or minimal restraint at the soft spot 232 on the left side of the correction station 140 are permanently deformed the greatest amount. Less permanent deformation occurs gradually in both circumferential directions towards the hard spot 234 located on the right side of the correction station 180° from the soft spot 232. The least amount of deformation occurs at the location of maximum restraint at the hard spot 234. The permanently longer each carcass reinforcing member 306 gets relative to its prestretch length, the "harder" it becomes in terms of radial force variation due to its permanent elongation. A belt restraint ring 280 (FIG. 8) may be optionally provided to counteract the relatively high inflation pressures so that the belt package 46 is not excessively expanded in the circumferential direction.

FIGS. 4 and 5 illustrate the same tire 40 after correction for first harmonic radial force variation. It will be apparent that the relative magnitude as defined by peak-to-peak magnitudes of the corresponding composite and first harmonic wave forms are dramatically lower in the wave forms of corrected tire 40 as illustrated in FIGS. 4 and 5 than in the initial wave forms of the uncorrected tire as illustrated in FIGS. 2 and 3. Also illustrated in FIG. 4 is a curve after the tire 40 has been in service for a predetermined amount of time as would occur after, for example, 1,000 miles of service. This illustrates that the uniformity correction is permanent.

Figure 13:
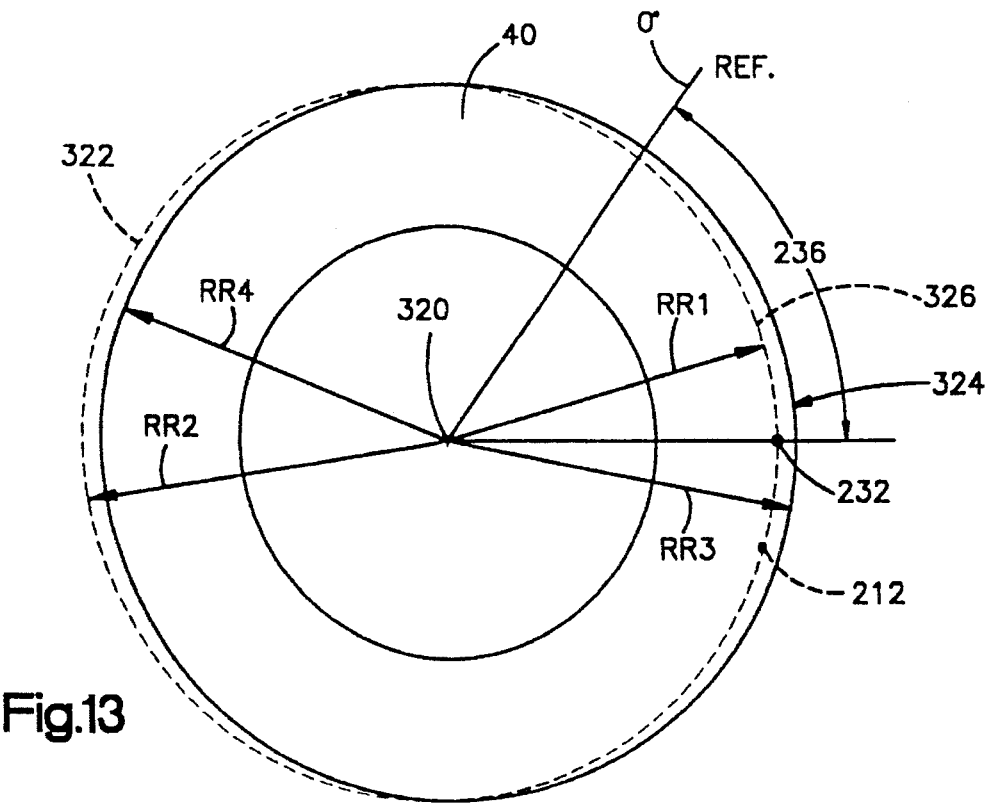
FIG. 13 is a side view of a tire before and after correction illustrating the introduction of radial runout of the tire to offset an existing radial force variation.

Another physical representation of what actually occurs when the first harmonic radial force variation of the tire 40 has been corrected according to the present invention is illustrated in FIG. 13. It is known that radial runout of the tire 40 affects the radial force variation. Such a radial runout is exaggerated in FIG. 13, as the outer circumference 322 of the tire 40 in dashed line. The radius RR1 on the right side of the tire 40 in relation to the center of rotation 320 of the tire 40 established by the beads 42 is relatively smaller than the radius RR2 on the left side. The portion of the tire 40 at the farmost location to the right would be deemed to be the location 236 of the soft spot 232 of the tire which would lend itself to first harmonic radial force variation correction.

During correction according to the present invention, the radius RR1 is increased over a rightmost portion 326 of the outer circumference 322 of the tire 40 to a radius RR3 due to the relatively greater elongation of carcass reinforcing members in the vicinity of the soft spot 232. The radius RR2 is reduced to a radius RR4. The belt package 46 is relatively inextensible and the outer circumference of the tire 40 does not increase. However, the location of the entire tread or outer circumference of the tire shifts to the right, as viewed in FIG. 13. This radial runout correction allows the now relatively uniform radii RR3,RR4 to establish new outer circumference 324 (solid line) relative to the center of rotation 320 for the corrected tire 40. This radial runout correction frequently reduces the magnitude of the first harmonic radial force variation a sufficient amount to be deemed acceptable. However, when the first harmonic radial force variation is caused by tire attributes other than radial runout, it may be necessary to introduce a radial runout to reduce the magnitude of the first harmonic radial force variation.

What has actually taken place during the correction operation 258 (FIG. 14) in this physical representation, is correction by introducing a radial runout to the tire 40. This introduced radial runout offsets the first harmonic radial force variation regardless of the attribute of the tire 40 producing the radial force variation. While the corrected radii RR3,RR4 are not exactly equal necessarily, the resulting radial force variation (be it composite or first harmonic) is reduced during rotation of the tire 40.

The correction has been introduced over the portion 326 of the tire 40 by maximally permanently elongating portions 302 of the carcass reinforcing members 306 located in both sidewalls of the tire 40 (FIGS. 9 and 10). The portions 312 of carcass reinforcing members 306 in the sidewalls of the tire 40 that were minimally permanently elongated or not elongated at all were restrained by the restraint rings 182 as described above. For example, the restraint rings 182 would place the maximum amount of restraint and maximum deflection at the leftmost portion of the sidewall of the tire 40, as viewed in FIG. 13. This portion of the tire 40 corresponds to the location of the first harmonic hard spot 234. At the same time, minimum restraint and minimum deflection or even a gap would be allowed at the rightmost portion of the sidewall, as viewed in FIG. 13. This portion of the tire 40 corresponds to the location 236 of the first harmonic soft spot 232. When the restrained tire 40 is inflated to a predetermined pressure, as described above, and held for a predetermined time, the portions 302 of the carcass reinforcing members 306 in the minimally restrained portions of the tire are permanently elongated by an amount greater than in the maximally restrained portions 312 of the tire.

The procedure described above corrects the first harmonic of the radial force variation associated with the location 236 of the soft spot 232 indicated by the signal generated by the controller 166. However, if the second, third, fourth or greater harmonics of radial force variation is desired to be corrected, the location and number of minimum restraints must be varied on the sidewalls of the tire 40 during subsequent inflation and correction operations. For example, for the second harmonic of radial force variation to be corrected based on the wave form illustrated in FIG. 3 the amount of minimum restraint would be at two different locations 237 of second harmonic soft spots 233 from the location 236 of the first harmonic soft spot 232. Typically, the maximum amount of restraint as a function of the magnitude at the location indicated by the signal generated by the controller 166 will likely be less for the second harmonic than for the first harmonic. The maximum restraint can be maintained in the controller 166 and control program as a function of the second harmonic peak-to-peak magnitude. It should be apparent that higher order harmonics of the radial force variation would be corrected in a manner similar to that described for the first and second harmonics.

Another correction option in operation 208 (FIG. 14) is that of composite radial force variation correction. In operation 210 the hard spot 214 (FIG. 2) of the composite radial force variation of the tire 40 is identified as well as its location 215 relative to a physical reference on the tire. The location 216 of the composite soft spot 212 is also identified in the controller 166 and control program. The controller 166 and control program determine or read the composite peak-to-peak magnitude which is represented by a distance 218 to be approximately 7 daN. The magnitude 218 and the location 216 of the soft spot 212 may be used as input parameters for the correction operation 258 (FIG. 14) if the magnitude falls within a predetermined range of magnitudes deemed appropriate for correction. For example, the range may be six daN to 12 daN.

It should be apparent, in the wave forms illustrated in FIGS. 2 and 3, that the locations 216,236 of the respective soft spots 212,232 may be offset relative to one another. This results because the Fourier analysis defines the locations of the soft spot and hard spot of, for example, the first harmonic wave form as being 180° apart. Similar even spacing of the respective adjacent soft and hard spots of the other harmonic wave forms also occur. It should also be apparent that the soft spot 212 of the composite wave form is not necessarily spaced 180° from the hard spot 214 but occurs as sensed during testing. For example, in the composite wave form illustrated in FIG. 2, the soft spot 212 is spaced approximately 150° from the hard spot 214.

If composite radial force variation correction is desired, the location 216 of the soft spot 212 of the composite radial force variation is positioned at the far left hand side of the correction station 140, as viewed in FIG. 6. This positioning can be done by first marking the tire 40 so the soft spot 212 is located angularly from the physical reference. A first order composite radial force variation correction is performed as outlined in operation 258 (FIG. 14) and as described above for first harmonic correction. The correction involves permanent elongation of portions of carcass reinforcing numbers 306, preferably by increasing the inflation pressure of the tire 40 considerably above the recommended operating pressure of the tire and holding that increased pressure for a predetermined hold time.

The maximum amount of restraint for composite radial force variation correction should be at the composite hard spot 214 on the tire 40. However, for the composite wave form illustrated in FIG. 2, the location 215 of the hard spot 214 is 150° away from the location 216 of the soft spot 212. The maximum restraint of the "first harmonic" restraint rings 182 will occur at the location 180° from the location 216 of the composite soft spot 212 when the restraint ring 182, described above, is used. A minimum amount of restraint, no restraint or a gap is applied to the sidewalls of the tire 40 at the location 216 of the soft spot 212,217 indicated by the signal and known to the controller 166 at the correction station 140. Thus, some tradeoff in the location of maximum restraint occurs due to the use of the first harmonic restraint rings 182.

Figure 21:
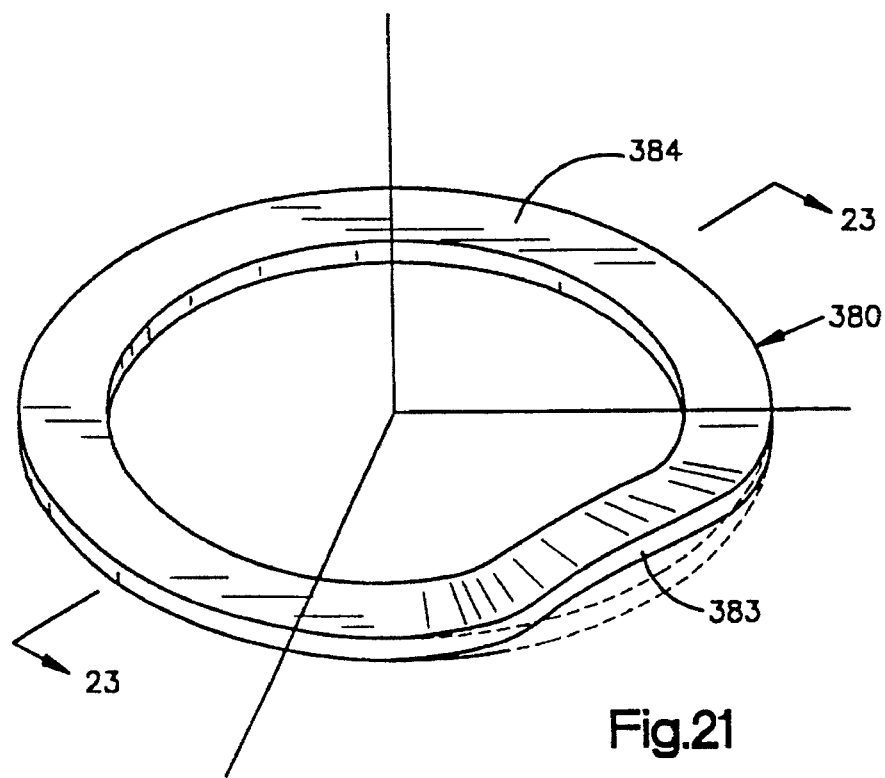
FIG. 21 is a perspective view of the alternate embodiment of a restraint ring embodying the present invention for selectively restraining portions of a sidewall of a tire.

As an alternative embodiment, a restraint ring 380 (FIG. 21) can be used which has a cupped segment 383 which is not in a plane containing the planar surface 384. For example, the cupped segment 383 preferably extends over a 90 degree arc length of the restraint ring 380. The cupped segment 383 provides nonlinear restraint to the tire 40. Such a cupped restraint ring 380 can be used to correct composite radial force variation as illustrated in FIG. 2, by relatively positioning the cupped segment 383 relative to a soft spot 212 or 217. With several (two for the wave form illustrated in FIG. 2) different angular locations of the restraint ring 380 and associated inflation pressure cycles for the same tire 40, the composite radial force variation of the tire can be effectively corrected. It is apparent that the shape of the surface of restraint ring 380, namely the number, size and position of segments 383, can be selected to give any predetermined restraint ring shape within the scope of this invention. However, the maximum correction will still occur at the soft spot 212 because minimal restraint (maximum cupping) can be applied at the location 216. Other restraint devices could be developed to optimize the location of maximum restraint.

If the controller 166 and control program, as illustrated in FIG. 14, determine that the tire 40 is to be corrected for conicity in operation 202, the location or side of the tire 40 requiring the correction is identified in operation 204 to the controller. The location or side of the tire requiring correction is a function of the direction of conicity. The parameters as to the location or side of the tire 40 and the magnitude of correction required by the tire 40 are used by the controller 166 and control program in the correction operation 208. These parameters are input to operation 206 and stored for the correction operation 258 for each tire 40 to be corrected.

In order to correct conicity of the tire 40 in the correction station 140 illustrated in FIG. 7 the following procedure is performed. If the side of the tire 40 to be corrected for conicity is located facing upwardly in the correction station 140, then no restraint will be applied to the upwardly facing sidewall of the tire. The lower restraint ring 182D is brought into engagement with the lower sidewall of the tire 40. The lower restraint ring 182D is moved axially inwardly a substantially equal amount over the entire planar contact surface of the restraint ring 182D. Thus, the lower restraint ring 182D is not tilted and the upper restraint ring 182U does not engage the tire 40. However, it will be apparent that two restraint rings 182 could be used for conicity correction with different amounts of restraint used on the different sidewalls of the tire 40, as described herein below.

When the proper amount of deflection or restraint has been applied to the lower sidewall of the tire 40 by the restraint ring 182D, correction for conicity may be initiated. The internal pressure of the tire 40 is then elevated to an amount sufficient to produce a desired permanent elongation in the carcass reinforcing members 306 in one sidewall of the tire. Such a pressure may be, for example, 100 psi or 7 bars. The deflection and elevated internal pressure is held for a relatively short period of time, for example, for ten seconds. The tire 40 is then deflated and the restraint removed from the lower sidewall of the tire and the tire is removed from the correction station 140. The conicity correction has occurred in the portions of the carcass reinforcing members in the upper sidewall of the tire 40 which was not restrained. All of the portions of the carcass reinforcing members in the upper sidewall of the tire were permanently stretched preferably by an equal amount. The belt restraint ring 280 may be used to keep the tread 62 of the tire 40 from moving axially during conicity correction.

It will be apparent that if the lower sidewall of the tire 40 as it is placed in the correction station 140 needed correction, then the upper sidewall of the tire would be restrained by deflecting it axially inwards. It should also be apparent that depending on the amount and location of conicity desired to be corrected, that the restraint rings 182D,182U could both engage opposite sidewalls of the tire to apply differing deflection based on the magnitude of correction desired. Thus, the inflation and hold procedure can take place and correct both sidewalls by differing amounts. It will also be apparent that one restraint ring 182 could be tilted if the magnitude of the conicity sign to be corrected is not a constant amount circumferentially around the tire 40.

If a conicity characteristic is to be corrected, the side of the tire 40 needing the correction is identified to the controller 166 and control program. No special angular orientation of the tire 40 is generally needed if a conicity characteristic is to be corrected. The side of the tire 40 needing correction and the amount or magnitude of correction required must be known for conicity characteristic correction on the correction station 140 of the present invention.

The restraint rings 182 each preferably have a flat or planar surface 260 (FIG. 8) for use in correction of the first harmonic or composite of radial force variation or in correction of conicity. Each restraint ring 182 has a radial length of engagement LE1 (FIG. 9) with the sidewall of the tire 40 which is a relatively small percentage (i.e. less than 25%) of the section height SH (FIG. 8) of the tire. The edges 278 of the restraint ring 182 may be rounded to avoid sharp edges. The restraint ring 402 may also have a radial length of engagement LE2 (FIG. 15) that is a relatively large percentage (i.e. greater than 25%) of the section height SH of the tire 40.

Figure 23:
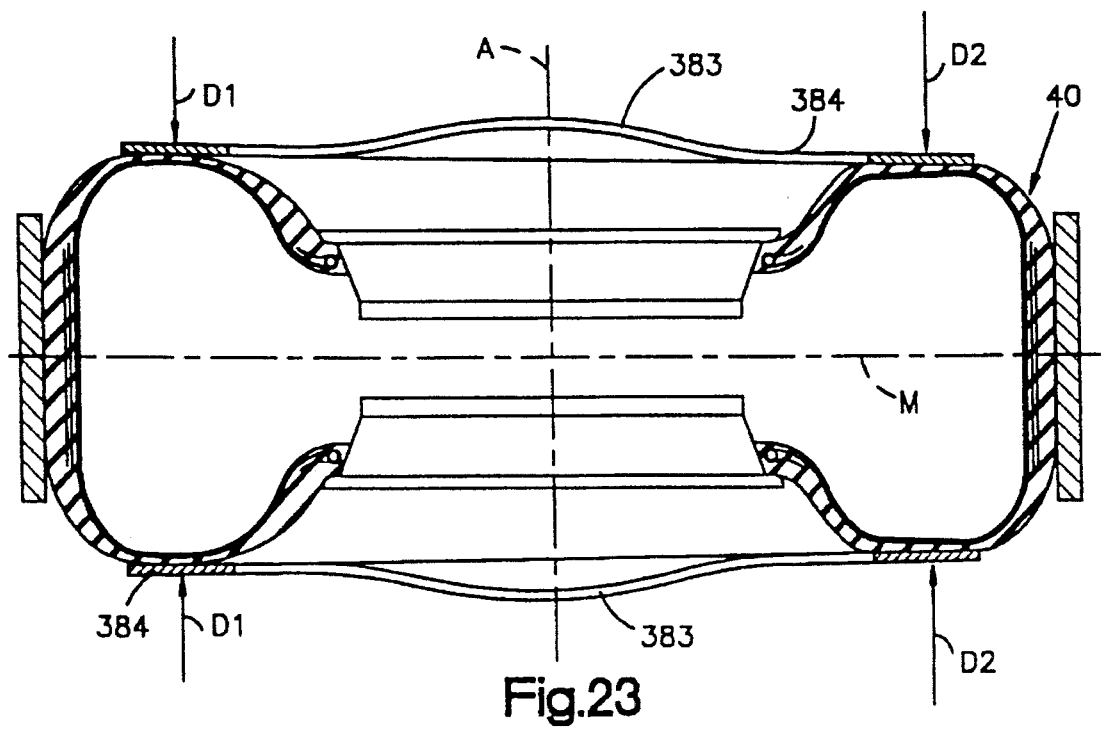
FIG. 23 is a cross-sectional view, similar to FIG. 8, of a tire restrained by the restraint ring illustrated in FIG. 21.

If a restraint ring 380 (FIG. 21) is provided with a cupped or concave surface in one or more locations, then other harmonics may be corrected during one correction operation. Such a restraint ring 380 is described above and may have a cupped portion 383 over 90° of the surface 384 (FIG. 23). This allows correction of, for example, first and second harmonics of radial force variation when the soft spot of the second harmonic is located away from the soft spot of the first harmonic. The placement of the restraint ring 380 against the tire 40 is determined by the controller 166 to be optimal under program parameters.

Figure 12:
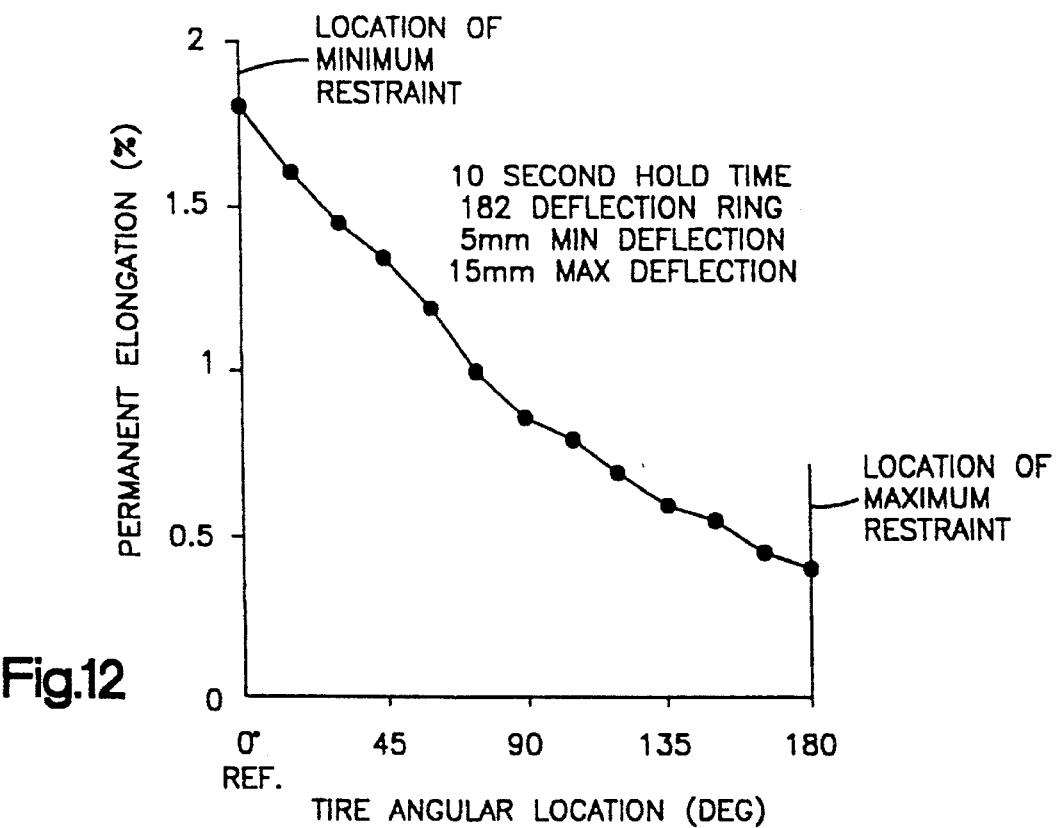
FIG. 12 is a graphical representation of permanent elongation of carcass reinforcing members between locations of minimum and maximum restraint of the sidewall in both directions and as a function of angular location around the tire.

The amount of permanent deformation to the carcass reinforcing members 306 occurs by stretching a portion 302 or 312 of the carcass reinforcing member which is preferably located in a sidewall of the tire beyond its elastic limit (FIG. 10). This may be done by stretching the cord permanently in the range of 0.1 to 2 or 3 percent or some predetermined amount as a function of the magnitude of uniformity characteristic desired to be corrected, and the material of the carcass reinforcing member. The results of a first harmonic linear correction by 5 millimeters minimum restraint and 15 millimeters maximum restraint is illustrated FIG. 12. The tire 40 was exposed to 100 psi (7 bars) of internal pressure for ten seconds of hold time with a planar surface restraint ring 182. It has been observed that for a passenger car tire, one percent of permanent elongation of the carcass reinforcing member 306 between the points 304 and 308 (FIG. 10) at the first harmonic soft spot and zero percent at the hard spot results in approximately 10 daN of first harmonic radial force variation.

Figure 22:
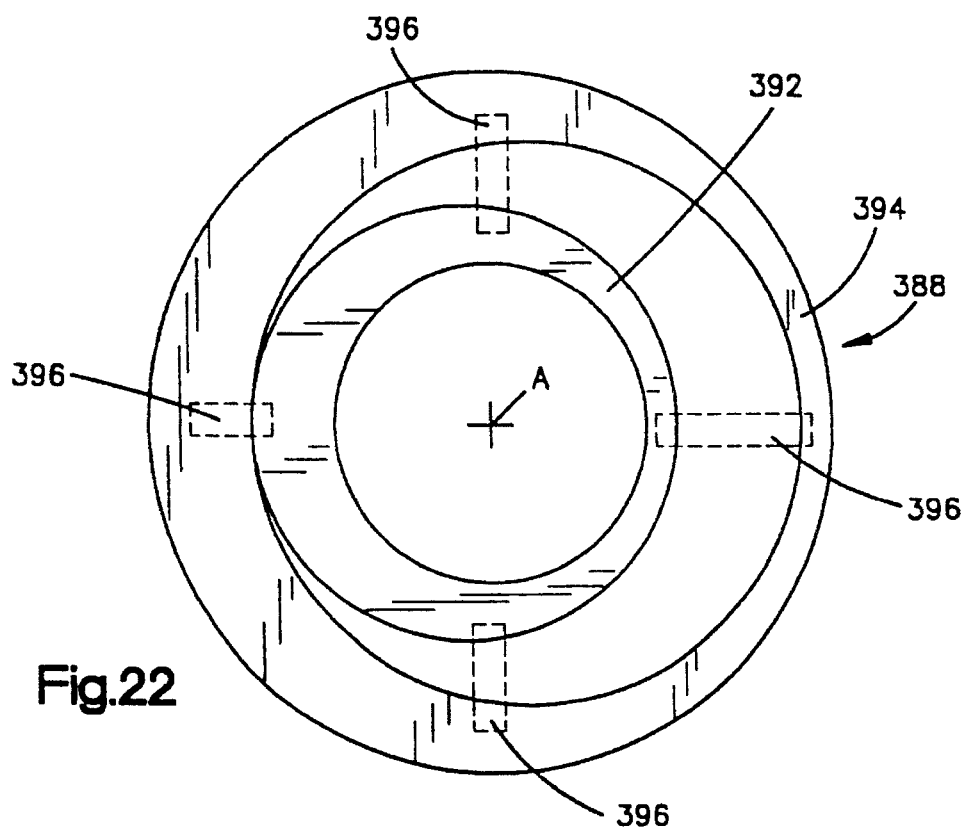
FIG. 22 is a side view of the restraint ring (illustrated in FIG. 11) for varying the amount of restraint around the tire.

An alternate restraint device 388 is illustrated in FIG. 11. A portion of the sidewall of the tire 40 is restrained without a deflection. The restraint device 388 comprises two portions 394 that contact the tire 40 at two radial locations 390,392. These radial locations 390,392 contact the outer surface of the sidewall of the tire 40. The portions 394 of the restraint device 388 are spaced equally from the equatorial plane E. The sidewall of the tire 40 has an unrestrained length 396 which is deflected by the inflation pressure. The unrestrained length 396 has a minimum dimension associated with the hard spot and a maximum dimension associated with the soft spot. The unrestrained length 396 of the restraint device 388 varies circumferentially around the tire from the hard spot to the soft spot, as illustrated in FIG. 22. The carcass reinforcing members are permanently elongated during inflation a greater amount where the unrestrained length 396 has a larger dimension.

The restraint device 388 has interconnecting parts 398 so that the portions 394 in contact with the tire can act as one device. This restraint device 388 allows the carcass reinforcing members to have a deflection 316 and a radius of curvature R4 which is smaller than the initial unrestrained radius of curvature R1 under the influence of inflation pressure.

Figure 15:
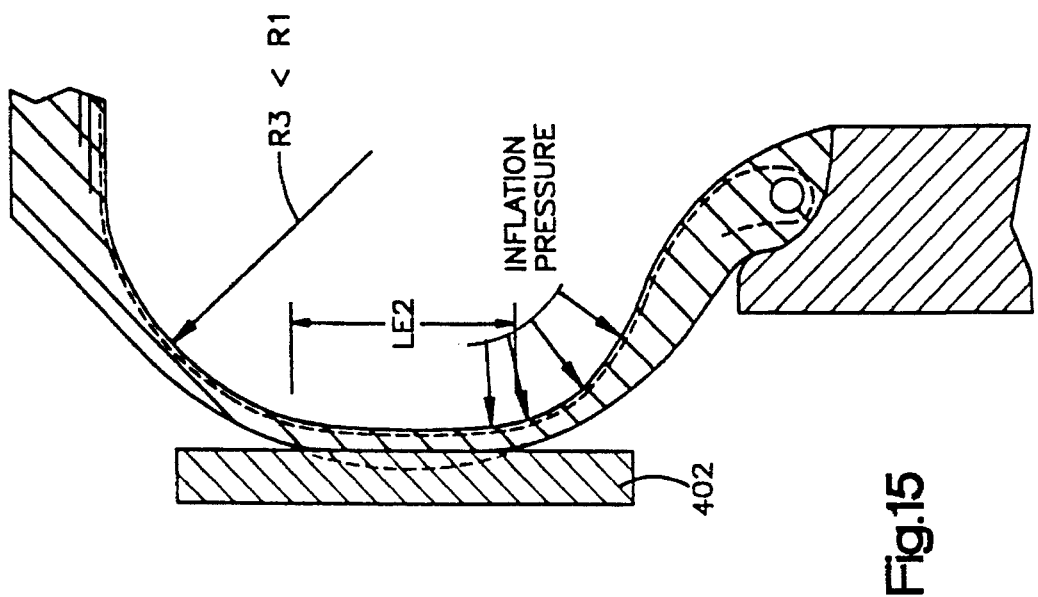
FIG. 15 is a cross-sectional view of an alternative embodiment restraint of the tire sidewall.

FIG. 15 illustrates a flat surface restraint ring 402 having a radial length of engagement LE2 which is a relatively large percentage of the section height SH of the tire for a radial length of engagement. This yields a radius of curvature R3 which is less than the initial radius of curvature R1. FIG. 16 corresponds to a schematic illustration of what occurs to the portion 422 of the carcass reinforcing member during correction under relatively high pressure with the restraint ring 402.

Figure 17:
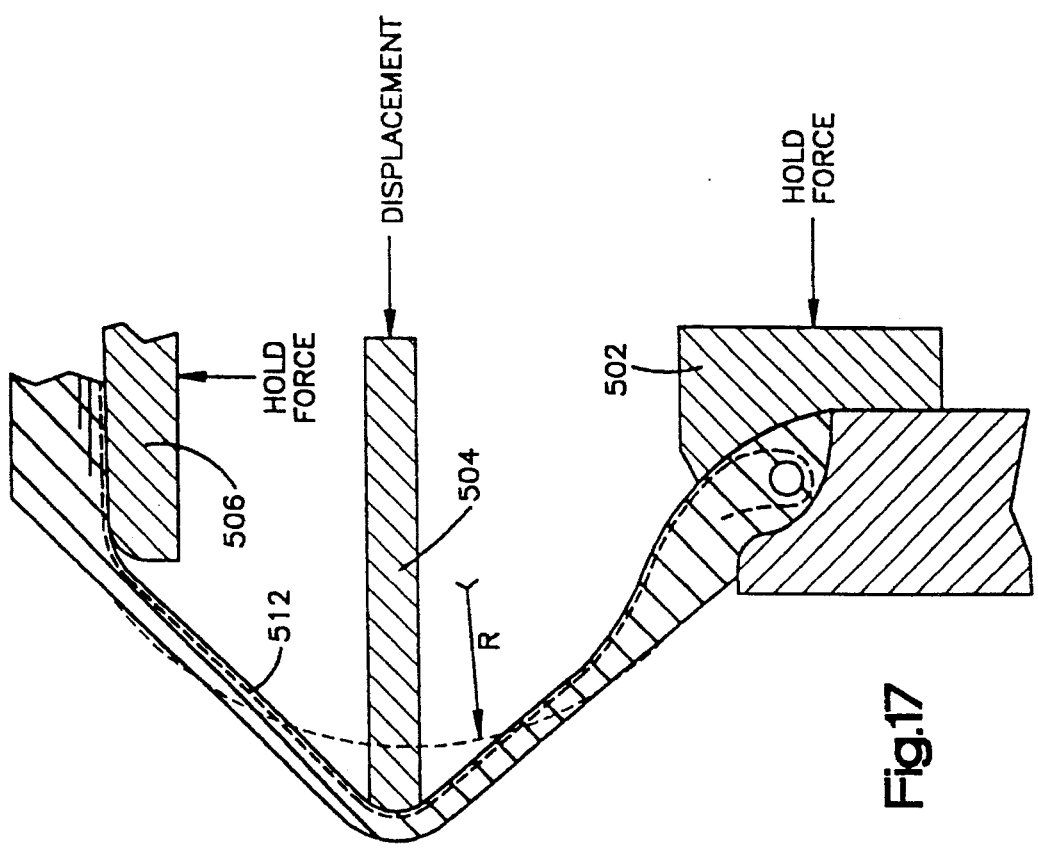
FIG. 17 is a cross-sectional view of another alternate embodiment illustrating stretching a sidewall portion of the carcass reinforcing member by a mechanism.
Figure 19:
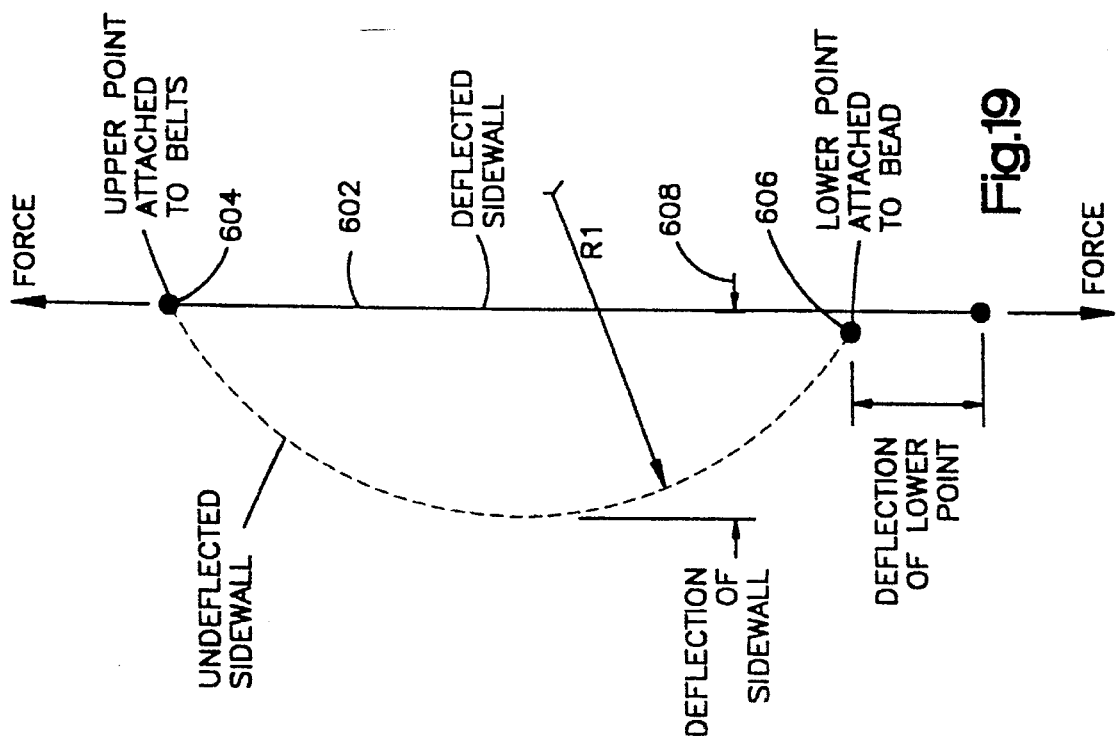
FIG. 19 is a graphical representation of yet another alternate embodiment of the present invention method that illustrates stretching a portion of the carcass reinforcing member by a mechanism.
Figure 18:
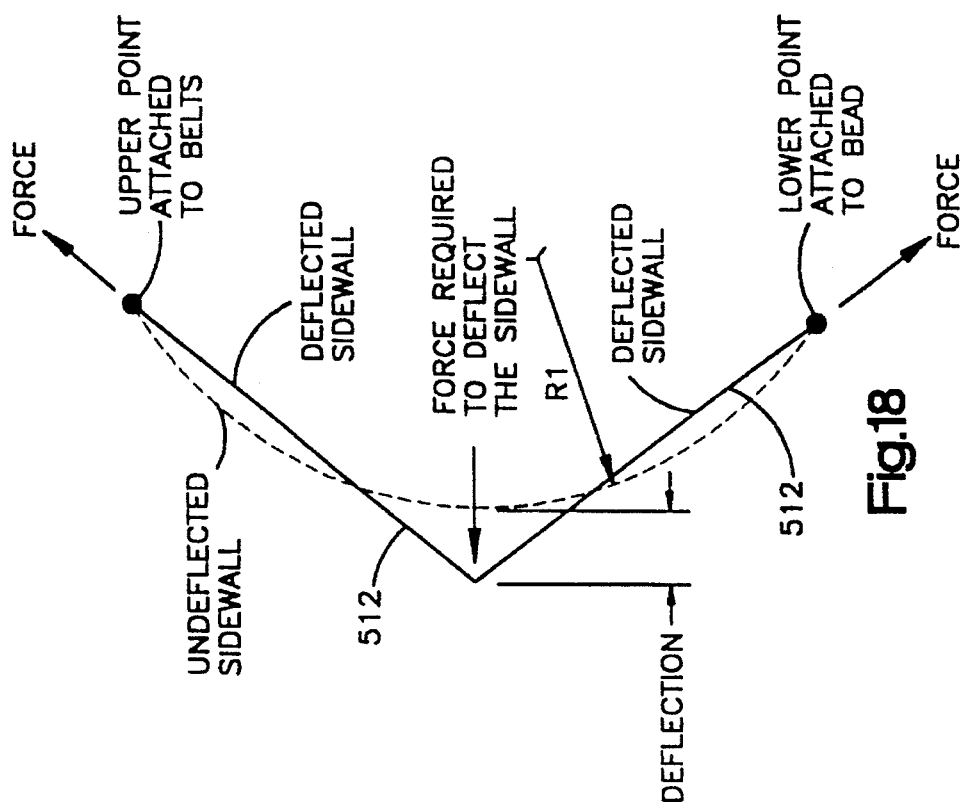
FIG. 18 is a graphical representation of the carcass reinforcing member stretched according to the embodiment illustrated in FIG. 17.

FIGS. 17 and 18 similarly schematically illustrate an alternative method and apparatus for use without an inflation pressure increase in the tire 40. The devices 502, 504, 506 mechanically stretch portions 512 of the carcass reinforcing member axially outwardly beyond its elastic limit. FIG. 19 is another schematic illustration of mechanically stretching a portion 602 of the carcass reinforcing member beyond its elastic limit. This is done by radially stretching the portion 602 of the carcass reinforcing member between the upper and lower attachment points 604, 606 in the sidewall of the tire 40. Deflection 608 of the portion 602 results. This stretching could be accomplished by moving point 606 radially inward, and point 604 radially outward or by moving point 604 radially outward. It should be apparent that stretching of the portion of carcass reinforcing members could be accomplished by a combination of mechanical stretching and by inflation pressure stretching.

The following is an example of a radial force variation correction performed in accordance with the method and apparatus of the present invention.

| | TEST RESULTS OF CORRECTED TIRES 3 mm Maximum Restraint Deflection 6 mm GAP Minimum Restraint 10 Second Hold Time | | | |
|---|---|---|---|---|
| Tire | Before Correction | After Correction | Improvement | Treatment Pressure (bar) |
| 1 | 3.7 daN | 2.0 daN | 1.7 daN | 7.5 |
| 2 | 4.6 | 2.3 | 2.3 | 8.0 |
| 3 | 5.4 | 2.5 | 2.9 | 8.5 |
| 4 | 3.3 | 1.5 | 1.8 | 7.25 |
| 5 | 5.1 | 2.0 | 3.1 | 8.25 |
| 6 | 2.8 | 0.8 | 2.0 | 7.0 |
| 7 | 4.7 | 2.3 | 2.6 | 8.0 |
| 8 | 4.9 | 2.3 | 2.6 | 8.0 |
| 9 | 4.2 | 1.2 | 3.0 | 7.75 |
| 10 | 6.0 | 1.8 | 4.2 | 8.5 |
| AVG | 4.47 | 1.87 | 2.60 | |

The tire used for test purposes was a Michelin® 205/70R15 XZ4 tire. It can be seen that a 58 percent average reduction of first harmonic radial force variation in the sample has occurred. This is a significant portion of the first harmonic radial force variation and the tire 40 so corrected will provide a dramatically improved ride when it is on the vehicle than if it had not been corrected. The correction occurred without grinding of the tire 40 and in a relatively short period of time.

From the above description of preferred embodiments of the invention, those skilled in the art will perceive improvements, changes and modifications. Such improvements, changes and modifications within the skill of the art are intended to be covered by the appended claims.

Having described preferred embodiments of the invention, what is claimed is:

1. A tire comprising:

a pair of spaced apart and substantially circumferentially inextensible beads;

a carcass extending between said beads and having axially opposite end portions attached to respective beads, said carcass including a plurality of parallel extending reinforcing members; and at least one of said carcass reinforcing members having a portion permanently deformed beyond its elastic limit to reduce a uniformity characteristic of the tire.

2. The tire set forth in claim 1 wherein said reinforcing members are made from a polyester material.

3. The tire set forth in claim 1 further including a belt package located radially outward of said carcass at a crown portion of the tire, said portion of said carcass reinforcing member located in a sidewall of the tire.

4. The tire set forth in claim 1 wherein the length of said portion of said carcass reinforcing member is increased by at least one tenth percent after said portion is permanently deformed.

\* \* \* \* \*

UNITED STATES PATENT AND TRADEMARK OFFICE
CERTIFICATE OF CORRECTION

PATENT NO. : 5,458,176
DATED : Oct. 17, 1995
INVENTOR(S) : Rhyne

It is certified that error appears in the above-indentified patent and that said Letters Patent is hereby corrected as shown below:

Col. 8, line 28, "lower station" should read --station--;
       line 29, "upper and" should read --upper and lower--;
       line 65, "a unique" should read --or a unique--.

Col. 12, line 65, "spot" should read --spot 232--.

Col. 17, line 5, "sign" should read --signal--.

Signed and Sealed this

Twenty-first Day of May, 1996

Attest:

BRUCE LEHMAN

Attesting Officer    Commissioner of Patents and Trademarks